United States Patent
Lee et al.

(10) Patent No.: US 9,350,242 B2
(45) Date of Patent: May 24, 2016

(54) POWER SUPPLY AND DC-DC CONVERTER WITH VOLTAGE DROP CIRCUIT THEREIN

(71) Applicant: SAMSUNG ELECTRONICS CO., LTD., Suwon-si, Gyeonggi-do (KR)

(72) Inventors: Joon Hwan Lee, Uiwang-si (KR); Min Kwang Lee, Yongin-si (KR); Soon Bae Yang, Seongnam-si (KR); Jae Jin Kim, Seoul (KR); Dong Gyu Lee, Suwon-si (KR); Jung Suk Chu, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 94 days.

(21) Appl. No.: 14/258,573

(22) Filed: Apr. 22, 2014

(65) Prior Publication Data
US 2014/0327420 A1 Nov. 6, 2014

(30) Foreign Application Priority Data

May 3, 2013 (KR) .................. 10-2013-0049978
Jan. 2, 2014 (KR) .................. 10-2014-0000461

(51) Int. Cl.
H02M 3/156 (2006.01)
H02M 3/158 (2006.01)
H02M 3/07 (2006.01)
H02M 1/00 (2006.01)

(52) U.S. Cl.
CPC ............... *H02M 3/158* (2013.01); *H02M 3/07* (2013.01); *H02M 2001/0058* (2013.01)

(58) Field of Classification Search
CPC .................. H02M 3/156; H02M 3/158
USPC .................................. 323/282–285
See application file for complete search history.

(56) References Cited

U.S. PATENT DOCUMENTS

| 5,359,278 A | * | 10/1994 | Notohara et al. ....... G05F 1/613 323/222 |
| 5,479,337 A | * | 12/1995 | Voigt .................... H03F 3/2176 323/235 |
| 8,102,678 B2 | * | 1/2012 | Jungreis .............. H02M 1/4241 363/21.03 |
| 8,450,934 B2 | * | 5/2013 | Schmitt ................ H05B 41/298 315/106 |
| 2010/0014330 A1 | | 1/2010 | Chang et al. |

FOREIGN PATENT DOCUMENTS

DE  10 2011 100 010   10/2012

OTHER PUBLICATIONS

Cláudio Manoel C. Duarte et al., "An Improved Family of ZVS-PWM Active-Clamping DC-to-DC Converters", IEEE Transactions on Power Electronics, vol. 17, No. 1, Jan. 2002, pp. 1-7.
Extended European Search Report dated Aug. 6, 2015 from European Patent Application 14166459.9, 8 pages.

* cited by examiner

Primary Examiner — Yemane Mehari
(74) Attorney, Agent, or Firm — Staas & Halsey LLP

(57) ABSTRACT

A power supply includes a rectifier circuit to rectify power, a smoothing circuit unit to smoothen a voltage of the rectified power, and a voltage drop circuit unit to drop the smoothened voltage. The voltage drop circuit unit includes an electric charge storage circuit to output the voltage-dropped voltage, a resonance circuit to receive first current from the smoothing circuit unit and to supply second current to the electric charge storage circuit, and a current interruption circuit to control the first current and the second current using zero current switching for performing switching when current does not flow using a resonance circuit.

25 Claims, 28 Drawing Sheets

(a)

(b)

(a)

(b)

(c)

(d)

(a)

(b)

(a)

(b)

(a)

(b)

(a)

(b)

POWER SUPPLY AND DC-DC CONVERTER WITH VOLTAGE DROP CIRCUIT THEREIN

CROSS-REFERENCE TO RELATED APPLICATIONS

This application claims the benefit of Korean Patent Application No. 10-2013-0049978, filed on May 3, 2013, and Korean Patent Application No. 10-2014-0000461, filed on Jan. 2, 2014 in the Korean Intellectual Property Office, the disclosures of which are incorporated herein by reference.

BACKGROUND

1. Field

Embodiments disclosed herein relate to a power supply and a direct current (DC)-DC converter therein, for reducing switching loss, and more particularly, a power supply and a DC-DC converter therein, for zero current switching using a resonance circuit.

2. Description of the Related Art

In general, a direct current (DC)-DC converter refers to a circuit that drops an input DC voltage to output a lower voltage than the input voltage.

A representative example of the DC-DC converter includes a buck converter including a switching device, an inductor, and a diode. The buck converter may be configured in such a way that the switching device and the inductor are connected to each other in series between an input and an output and the diode is connected in parallel to the input and the output. The buck converter repeatedly turns on and off the switching device to output a lower voltage than an input voltage.

A conventional buck converter repeatedly turns on and off a switching device while current is supplied towards an output from an input, thereby resulting in switching loss. In addition, current continuously flows in one direction in an inductor, thereby generating substantial heat. Thus, there is a need for a separate heat dissipation device for heat dissipation.

SUMMARY

Therefore, it is an aspect of the disclosure to provide an improved direct current (DC)-DC converter using zero current switching for performing switching when current does not flow using a resonance circuit.

Additional aspects of the disclosure will be set forth in part in the description which follows and, in part, will be apparent from the description, or may be learned by practice of the invention.

In accordance with one aspect of the example embodiments disclosed herein, a power supply may include a rectifier circuit to rectify a power source, a smoothing circuit unit to smoothen a voltage of the rectified power source, and a voltage drop circuit unit to drop the smoothened voltage. The voltage drop circuit unit may include an electric charge storage circuit to output the voltage-dropped voltage, a resonance circuit to receive first current from the smoothing circuit unit and to supply second current to the electric charge storage circuit, and a current interruption circuit to control the first current and the second current.

The current interruption circuit may include a switching circuit to interrupt the first current and the second current, and a rectifier circuit to rectify the first current and the second current.

The switching circuit may include a first switch to interrupt the first current and a second switch to interrupt the second current.

The power supply may further include a voltage drop controller to control the first switch and the second switch.

The voltage drop controller may alternately open and close the first switch and the second switch.

The voltage drop controller may open and close the first switch and the second switch at a same period as a resonance period of the resonance circuit.

The rectifier circuit may include a first diode to pass the first current and to shut off the second current, and a second diode to shut off the first current and to pass the second current.

The current interruption circuit may include a switching circuit connected in series to the electric charge storage circuit, and a rectifier circuit connected in parallel to the electric charge storage circuit.

The switching circuit may include a first switch and a second switch that are connected in series to each other.

The rectifier circuit may include a first diode and a second diode that are connected in series to each other.

The resonance circuit may be disposed between a node to which the first switch and the second switch are connected and a node to which the first diode and the second diode are connected.

The resonance circuit may include at least one capacitor and at least one inductor.

The power supply may further include an initial charging circuit to initially charge the electric charge storage circuit.

The initial charging circuit may be disposed in series between one side of the electric charge circuit and one side of the switching circuit.

The initial charging circuit may include a charged current limiting circuit to limit an amount of initial charged current for charging the electric charge storage circuit, and a first initial charging switch to interrupt initial charged current supplied to the electric charge storage circuit.

The initial charging circuit may further include a second initial charging switch to interrupt initial charged current supplied to a resonance capacitor included in the resonance circuit.

In accordance with another aspect of the example embodiments disclosed herein, a voltage drop circuit for dropping a voltage of a power source may include an electric charge storage circuit unit to output the voltage-dropped voltage, a resonance circuit unit to receive first current from the power source and to supply second current to the electric charge storage circuit, and a switching circuit to interrupt the first current and the second current.

The switching circuit may include a first switch to interrupt the first current and a second switch to interrupt the second current.

The voltage drop circuit may further include a voltage drop controller to control the first switch and the second switch.

The voltage drop controller may alternately open and close the first switch and the second switch.

The voltage drop controller may open and close the first switch and the second switch at a same period as a resonance period of the resonance circuit.

The rectifier circuit may include a first diode to pass the first current and to shut off the second current, and a second diode to shut off the first current and to pass the second current.

The voltage drop circuit may further include an initial charging circuit to initially charge the electric charge storage circuit.

The initial charging circuit may include a charged current limiting circuit to limit an amount of initial charged current for charging the electric charge storage circuit, and a first initial charging switch to interrupt initial charged current supplied to the electric charge storage circuit.

In accordance with another aspect of the example embodiments disclosed herein, a voltage drop circuit for dropping a voltage of a power source may include at least one electric charge storage circuit unit to output the dropped voltage, at least one resonance circuit unit to receive first current from the power source and to supply second current to the electric charge storage circuit, a switching circuit to interrupt the first current and the second current, a rectifier circuit to rectify the first current and the second current, and a voltage drop controller to control the switching circuit.

The switching circuit may include a first switch which receives a first control signal from the voltage drop controller to interrupt the first current and a second switch which receives a second control signal from the voltage drop controller to interrupt the second current.

The rectifier circuit may include a first plurality of diodes connected in series to pass the first current and to shut off the second current when the first switch is controlled to be closed and the second switch is controlled to be opened, and a second plurality of diodes connected in series to shut off the first current and to pass the second current when the first switch is controlled to be open and the second switch is controlled to be closed.

The at least one electric charge storage circuit unit may include a first electric charge storage circuit connected in series with a second electric charge storage circuit. A first node disposed between the first electric charge storage circuit and the second electric charge storage may be connected to a second node disposed between one of the first plurality of diodes and one of the second plurality of diodes.

The at least one resonance circuit may include a first resonance circuit including a resonance inductor and a first resonance capacitor, and a second resonance circuit including the resonance inductor and a second resonance capacitor. A first end of the first resonance circuit may be connected to a first node disposed between the first switch and the second switch, and a second end of the first resonance circuit may be connected to a second node disposed between one of the first plurality of diodes and one of the second plurality of diodes. A first end of the second resonance circuit may be connected to the first node, and a second end of the second resonance circuit may be connected to a third node disposed between one of the first plurality of diodes and one of the second plurality of diodes.

The rectifier circuit may include a first diode to pass the first current and to shut off the second current when the first switch is controlled to be closed and the second switch is controlled to be opened, and a second diode to shut off the first current and to pass the second current when the first switch is controlled to be open and the second switch is controlled to be closed. The at least one resonance circuit may include a resonance inductor and a resonance capacitor, and a first end of the resonance circuit may be connected to a first node disposed between the first switch and the second switch, and a second end of the resonance circuit may be connected to a second node disposed between the first diode and the second diode.

The resonance capacitor may be connected to the first node and the resonance inductor may be connected to the second node.

In accordance with one aspect of the disclosure, the example embodiments disclosed herein relate to an improved DC-DC converter using zero current switching for performing switching when current does not flow using a resonance circuit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
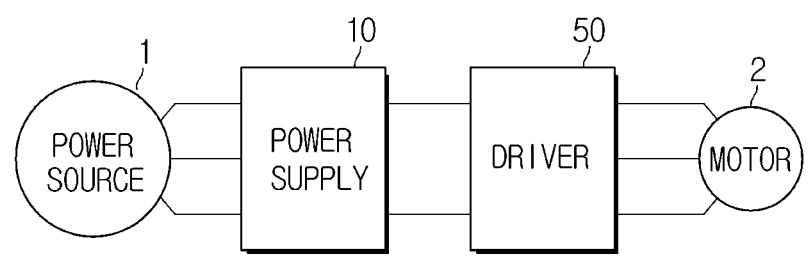
FIG. 1 illustrates a case in which power supplied from an external power source is converted to drive a motor.

It will be understood that the example embodiments described in this specification and configurations illustrated in the accompanying drawings are merely intended to show examples of the embodiments of the disclosure and that numerous modifications may be formed to correspond to the described embodiments and the drawings when the application is filed.

Reference will now be made in detail to the example embodiments of the disclosure, examples of which are illustrated in the accompanying drawings, wherein like reference numerals refer to like elements throughout.

FIG. 1 illustrates an example in which power supplied from an external power source 1 is converted to drive a motor 2.

Referring to FIG. 1, the external power source 1, a power supply 10, a driver 50, and the motor 2 may be included.

The external power source 1 may employ a single-phase alternating current (AC) power source for domestic use or a three-phase AC power source for industrial use or may employ direct current (DC) power supplied through a solar cell generator and so on.

The power supply 10 may convert an AC voltage and AC current supplied from the external power source 1 into a DC voltage and DC current, respectively and may voltage-drop the converted DC voltage to a voltage required by the driver 50.

The driver 50 may convert a DC voltage and DC current supplied from the power supply 10 to generate drive current to drive the motor 2 and may supply the generated drive current to the motor 2.

The motor 2 may receive the drive current from the driver 50 and may rotate a load (not shown) based upon interaction between a rotor (not shown) and a stator (not shown). For example, the motor 2 may be a motor for industrial use as well as a motor used in a home appliance such as a washer, a refrigerator, an air conditioner, or the like.

Hereinafter, for convenience of description, it is assumed that the external power source 1 is a three-phase AC power source and the motor 2 is a three-phase motor.

Figure 2:
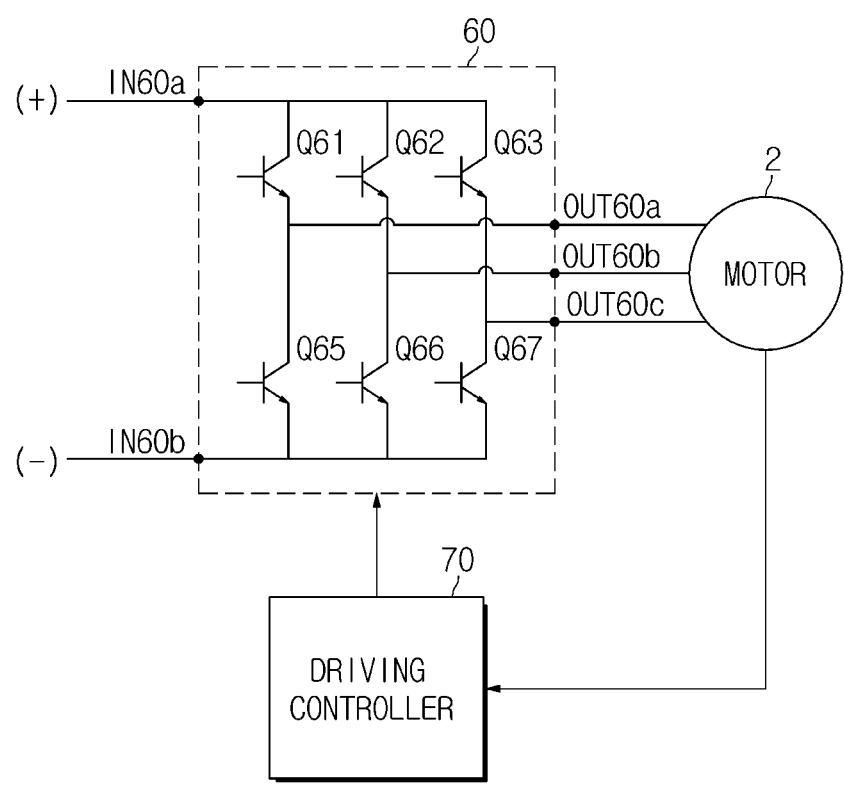
FIG. 2 illustrates an example of a driver and a motor of FIG. 1.

FIG. 2 illustrates an example of a driver and a motor of FIG. 1.

Referring to FIG. 2, the driver 50 may include a driving circuit unit 60 that receives DC power from the power supply 10 that will be described below to generate drive current to drive the motor 2, and a driving controller 70 to supply a drive control signal to the driving circuit unit 60 based on the drive current supplied to the motor 2.

The driving circuit unit 60 may include two input terminals IN60a and IN60b to receive DC power from the power supply 10 that will be described below, three output terminals OUT60a, OUT60b, and OUT60c to supply drive current to the motor 2, and six switches Q61, Q65, Q62, Q66, Q63, and Q67 to generate drive current supplied to the motor 2.

In detail, as illustrated in FIG. 2, three upper switches Q61, Q62, and Q63 may be connected in parallel to a positive input terminal IN60a. Three lower switches Q65, Q66, and Q67 may be connected in parallel to a negative input terminal IN60b. In addition, the three upper switches Q61, Q62, and Q63 and the three lower switches Q65, Q66, and Q67 may be connected in series in one-to-one correspondence. Three connection nodes to which the three upper switches Q61, Q62, and Q63 and the three lower switches Q65, Q66, and Q67 are connected in series in one-to-one correspondence may be connected to three output terminals OUT60a, OUT60b, and OUT60c of the driving circuit unit 60, respectively.

The driving circuit unit 60 turns on any one of the three upper switches Q61, Q62, and Q63 connected in parallel to the positive input terminal IN60a and any one of the three lower switches Q65, Q66, and Q67 connected in parallel to the negative input terminal IN60b in a predetermined order to supply the drive current to the motor 2.

The driving controller 70 provides a drive control signal to turn on any one of the upper switches Q61, Q62, and Q63 of the driving circuit unit 60 and any one of the lower switches Q65, Q66, and Q67 to the driving circuit unit 60 based on the drive current supplied to the motor 2. For example, the driving controller 70 may detect the drive current supplied to the motor 2, estimate a location of a rotor (not shown) of the motor 2 based on the detected drive current, generate a driving control signal so as to rotate a rotor of the motor 2 at a predetermined speed based on the estimated location of the rotor (not shown), and supply the generated drive control signal to the driving circuit unit 60.

The plural switches Q61 to Q63 and Q65 to Q67 included in the driving circuit unit 60 may employ an insulated gate bipolar transistor (IGBT) or a field effect transistor (FET) for allowing high voltage and high current to be shut off or to flow.

The driving circuit unit 60 is exemplified as, but is not limited to, a 2-level inverter. For example, the driver 50 may include a multi-level diode clamped inverter or a multi-level T-type neutral point clamped inverter.

Figure 3:
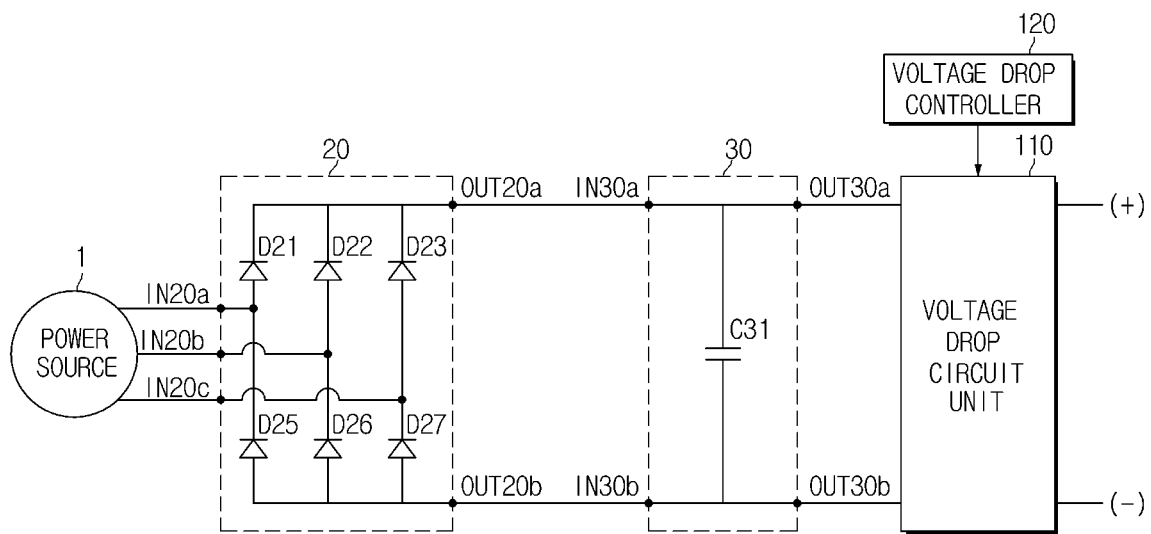
FIG. 3 illustrates the external power source illustrated in FIG. 1 and a power supply according to an embodiment.

FIG. 3 illustrates the external power source 1 illustrated in FIG. 1 and a power supply 10 according to an embodiment.

Referring to FIG. 3, the power supply 10 may include a rectifier circuit unit 20 to rectify an AC voltage and AC current supplied from the external power source 1 into a DC voltage and DC current, a smoothing circuit unit 30 to remove ripples of the DC voltage applied from the rectifier circuit unit 20, a voltage drop circuit unit 110 to drop the DC voltage from which ripples are removed, and a voltage drop controller 120 to supply a voltage drop control signal to the voltage drop circuit unit 110.

The rectifier circuit unit 20 may include three input terminals IN20a, IN20b, and IN20c to receive AC power from the external power source 1, two output terminals OUT20a and OUT20b to supply the rectified voltage and current to the smoothing circuit unit 30, and six diodes D21, D22, D23, D25, D26, and D27 connected in the form of a bridge.

For example, as illustrated in FIG. 3, three upper diodes D21, D22, and D23 may be connected in parallel to a positive output terminal OUT20a. Three lower diodes D25, D26, and D27 may be connected in parallel to a negative output terminal OUT20b. In addition, the three upper diodes D21, D22, and D23 and the three lower diodes D25, D26, and D27 may be connected in series to each other in one-to-one correspondence. Three connection nodes to which the three upper diodes D21, D22, and D23 and the three lower diodes D25, D26, and D27 are connected in series in one-to-one correspondence may be connected to the input terminals IN20a, IN20b, and IN20c of the rectifier circuit unit 20, respectively. Here, the six diodes D21, D22, D23, D25, D26, and D27 are arranged so as to provide a voltage applied from the external power source 1 in one direction only and to allow current to flow in one direction only.

A positive voltage applied from the external power source 1 is output to the positive output terminal OUT20a through the upper diodes D21, D22, and D23. A negative voltage applied from the external power source 1 is output to the negative output terminal OUT20b through the lower diodes D25, D26, and D27. In addition, current supplied from the external power source 1 may be supplied to the positive output terminal OUT20a of the rectifier circuit unit 20 through the upper diodes D21, D22, and D23. Current that returns to the external power source 1 through the negative output terminal OUT20b of the rectifier circuit unit 20 returns through the lower diodes D25, D26, and D27 of the rectifier circuit unit 20. That is, although an AC voltage and AC current are supplied from the external power source 1, the rectifier circuit unit 20 may output a DC voltage applied in one direction and DC current that flows in one direction.

The rectifier circuit unit 20 is exemplified as, but is not limited to, a 3-phase diode bridge.

The DC voltage and DC current output from the rectifier circuit unit 20 may be supplied to the smoothing circuit unit 30.

As illustrated in FIG. 3, the smoothing circuit unit 30 may include a pair of input terminals IN30a and IN30b to receive a DC voltage containing ripples from the rectifier circuit unit 20, a pair of output terminals OUT30a and OUT30b to output a smoothened DC voltage, and a capacitor C31 to store electric charges through the DC current supplied from the rectifier circuit unit 20.

The external power source 1 may apply an AC voltage in the form of a sine wave. Thus, although the voltage is rectified by the rectifier circuit unit 20, a voltage output from the rectifier circuit unit 20 may contain ripples. The capacitor C31 of the smoothing circuit unit 30 stores a large amount of electric charges so as to maintain a constant voltage between opposite ends of the capacitor C31. As a result, although a DC voltage containing ripples is input through the input terminals IN30a and IN30b, the smoothing circuit unit 30 may output a voltage from which ripples are removed, through the output terminals OUT30a and OUT30b.

The DC voltage and DC current output from the smoothing circuit unit 30 may be supplied to the voltage drop circuit unit 110.

The smoothing circuit unit 30 is exemplified as, but is not limited to, a capacitor.

The power supply 10 illustrated in FIG. 3 is exemplified as including the rectifier circuit unit 20, the smoothing circuit unit 30, and the voltage drop circuit unit 110, but is not limited thereto. For example, the power supply 10 may further include a power factor correction (PFC) circuit for improving a power factor of the external power source 1.

The voltage drop circuit unit 110 and the voltage drop controller 120 will be described below in detail.

Figure 4:
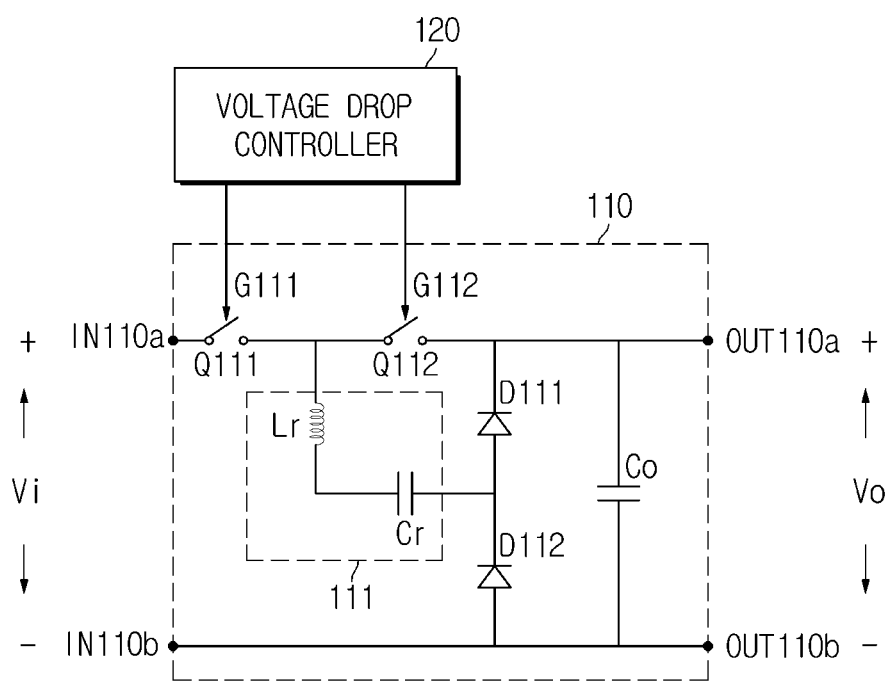
FIG. 4 illustrates a voltage drop circuit unit and a voltage drop controller according to an embodiment.

FIG. 4 illustrates the voltage drop circuit unit 110 and the voltage drop controller 120 according to an embodiment.

Referring to FIG. 4, the voltage drop circuit unit 110 may include a first switch Q111 and a second switch Q112 that are connected in series to each other between a pair of input terminals IN110a and IN110b to receive a DC voltage and a pair of output terminals OUT110a and OUT110b to output a voltage-dropped DC voltage. The voltage drop circuit unit 110 may further include an electric charge storage circuit Co connected in parallel to the pair of output terminals OUT110a and OUT110b, a first diode D111 and a second diode D112 that are connected in series to each other between opposite ends of the electric charge storage circuit Co, and a resonance circuit 111 disposed between a node to which the first switch Q111 and the second switch Q112 are connected and a node to which the first diode D111 and the second diode D112 are connected. For example, as shown in FIG. 4, a first end of the resonance circuit 111 may be connected to a first node disposed between the first switch Q111 and second switch Q112, and a second end of the resonance circuit 111 may be connected to a second node disposed between the first diode D111 and second diode D112. The first node of the resonance circuit 111 may be connected to resonance inductor Lr while the second node of the resonance circuit 111 may be connected to resonance capacitor Cr.

The first switch Q111 and the second switch Q112 may interrupt current supplied to the output terminals OUT110a and OUT110b from the input terminals IN110a and IN110b. For example, the first switch Q111 interrupts current supplied to the resonance circuit 111 from the input terminals IN110a and IN110b and the second switch Q112 interrupts current supplied to the electric charge storage circuit Co from the resonance circuit 111.

The first switch Q111 and the second switch Q112 may employ an insulated gate bipolar transistor (IGBT) or a field effect transistor (FET) for allowing high voltage and high current to be shut off or to flow.

The resonance circuit 111 may include a resonance inductor Lr to store magnetic energy and a resonance capacitor Cr to store electric energy. The resonance inductor Lr and the resonance capacitor Cr may be connected to each other in series. For example, the resonance inductor Lr and the resonance capacitor Cr receive current from the input terminals IN110a and IN110b, store the magnetic energy and the electric energy, and supply electric charges to the electric charge storage circuit Co through the stored magnetic energy and electric energy.

The first diode D111 and the second diode D112 guide current so as to supply electric charges to the electric charge storage circuit Co. For example, the first diode D111 supplies current supplied from the input terminals IN110a and IN110b to the electric charge storage circuit Co, and the second diode D112 supplies current supplied from the resonance circuit 111 to the electric charge storage circuit Co.

The electric charge storage circuit Co stores electric charges through current supplied from the input terminals IN110a and IN110b and outputs a voltage that is dropped compared with electric charges supplied to the input terminals IN110a and IN110b, to the output terminals OUT110a and OUT110b through the stored electric charges.

The voltage drop controller 120 generates a first voltage drop control signal and a second voltage drop control signal that control opening and closing of the first switch Q111 and second switch Q112 included in the voltage drop circuit unit 110 such that the voltage drop circuit unit 110 outputs a predetermined voltage, and supplies the generated first voltage drop control signal and second voltage drop control signal to the voltage drop circuit unit 110.

According to the control signal of the voltage drop controller 120, the voltage drop circuit unit 110 may operate in two modes. For example, the voltage drop circuit unit 110 may operate in a first operation mode in which the first switch Q111 is closed and the second switch Q112 is opened, and a second operation mode in which the first switch Q111 is opened and the second switch Q112 is closed.

First, voltage drop by the voltage drop circuit unit 110 will be described below.

Figure 5:
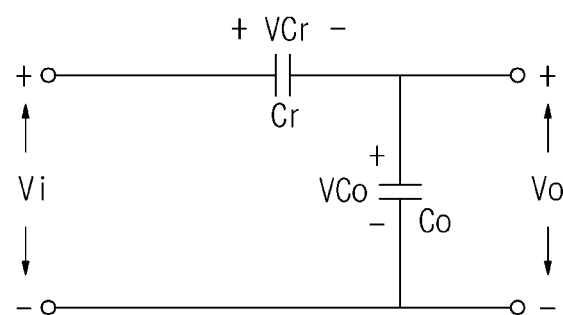
FIG. 5 illustrates flow of current when a voltage drop circuit unit operates in a first operation mode according to an embodiment.
Figure 6:
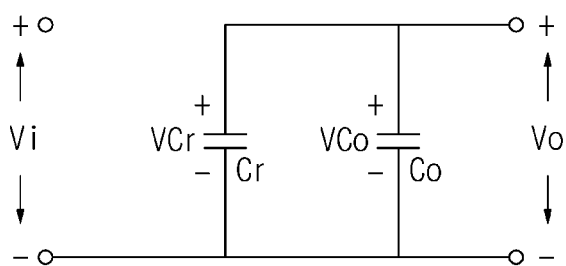
FIG. 6 illustrates an amount of current supplied to an electric charge storage circuit when a voltage drop circuit unit operates in the first operation mode according to an embodiment.

FIG. 5 is a diagram for explanation of a DC component of a voltage applied to the voltage drop circuit unit 110 when the voltage drop circuit unit 110 operates in a first operation mode according to an embodiment. FIG. 6 is a diagram for explanation of a DC component of a voltage applied to the voltage drop circuit unit 110 when the voltage drop circuit unit 110 operates in a second operation mode according to an embodiment.

Figure 7:
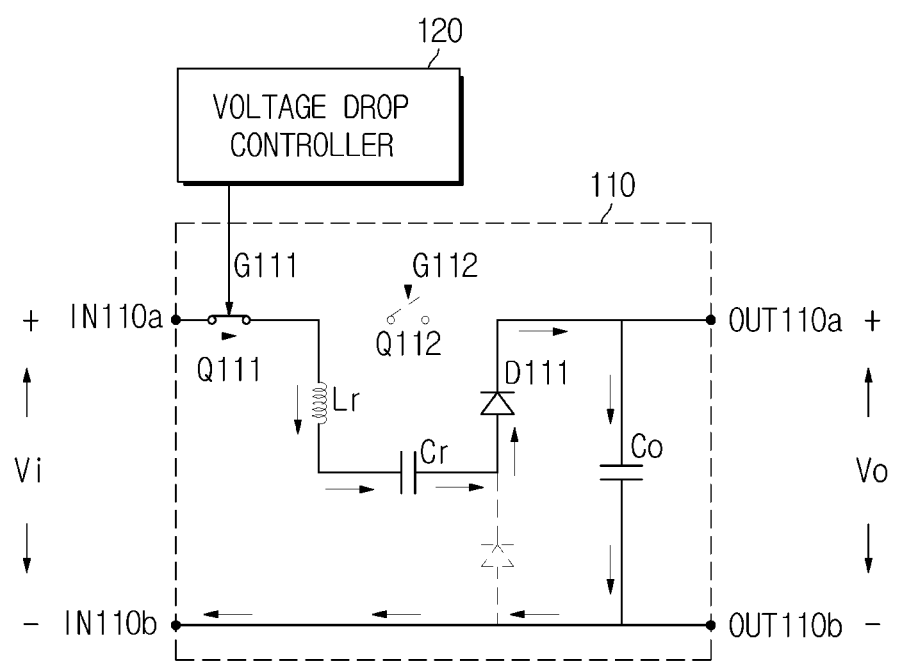
FIG. 7 illustrates flow of current when the voltage drop circuit unit operates in a second operation mode according to an embodiment.

When the voltage drop circuit unit 110 operates in the first operation mode, voltages applied to the first switch Q111 and the first diode D111 are very small and thus may be negligible. In addition, in consideration of only a DC component of a voltage applied to the voltage drop circuit unit 110, the resonance inductor Lr of the resonance circuit 111 may also be negligible. Thus, the voltage drop circuit unit 110 corresponds to a simple circuit including the resonance capacitor Cr of the resonance circuit 111 and the electric charge storage circuit Co, as illustrated in FIG. 7.

An input voltage Vi input to the voltage drop circuit unit 110 is equal to the sum of a voltage VCr applied to the resonance capacitor Cr and a voltage VCo applied to the electric charge storage circuit Co. An output voltage Vo output from the voltage drop circuit unit 110 is equal to a voltage VCo applied to the electric charge storage circuit Co.

Figure 9:
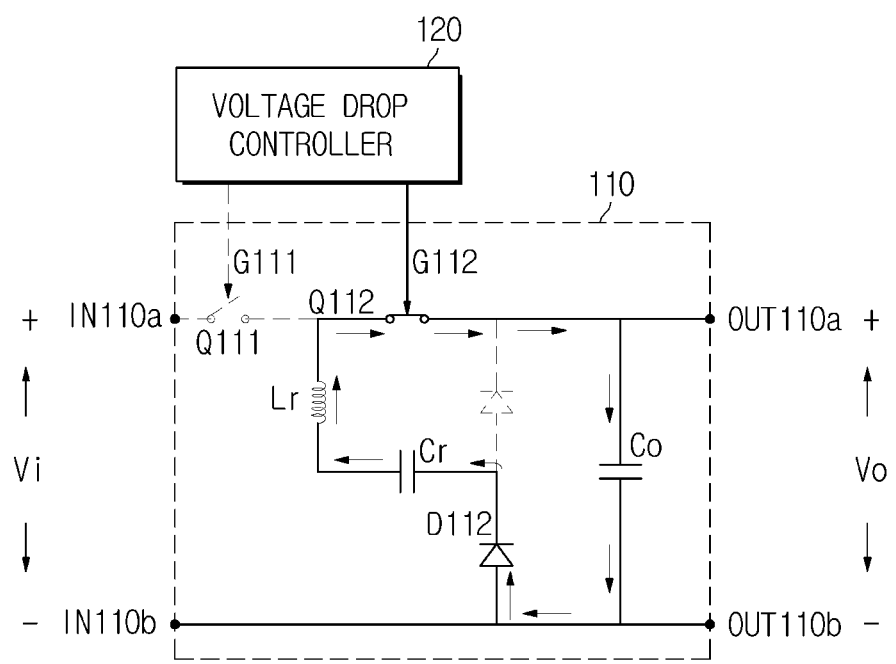
FIG. 9 is a diagram for explanation of a DC component of a voltage applied to a voltage drop circuit unit when a voltage drop circuit unit operates in the first operation mode according to an embodiment.

In addition, when the voltage drop circuit unit 110 operates in the second operation mode, the voltage drop circuit unit 110 also corresponds to a simple circuit including the resonance capacitor Cr of the resonance circuit 111 and the electric charge storage circuit Co, as illustrated in FIG. 9.

In this case, an output voltage Vo output from the voltage drop circuit unit 110, a voltage VCo applied to the electric charge storage circuit Co, and a voltage VCr applied to the resonance capacitor Cr are equal to each other.

In addition, since the resonance capacitor Cr constitutes the resonance circuit 111, a DC component of the voltage VCr applied to the resonance capacitor Cr is not changed in the first operation mode and the second operation mode.

Thus, the voltage VCr applied to the resonance capacitor Cr in the first operation mode and the voltage VCo applied to the electric charge storage circuit Co are equal to each other. The voltage drop circuit unit 110 outputs half an input voltage Vi of the voltage drop circuit unit 110.

Hereinafter, flow of current in the voltage drop circuit unit 110 when the voltage drop circuit unit 110 operates in the first operation mode and the second operation mode will be described.

Figure 8:
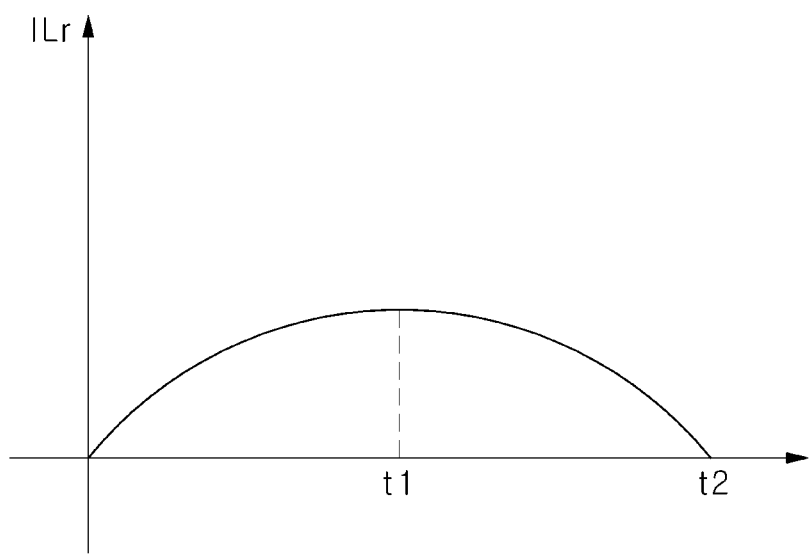
FIG. 8 illustrates an amount of current supplied to an electric charge storage circuit when the voltage drop circuit unit of FIG. 3 operates in the second operation mode.

FIG. 7 illustrates flow of current when the voltage drop circuit unit 110 operates in the first operation mode according to an embodiment. FIG. 8 illustrates an amount of current supplied to the electric charge storage circuit Co when the voltage drop circuit unit 110 operates in the first operation mode according to an embodiment.

When the first switch Q111 is closed and the second switch Q112 is opened, current is supplied to the electric charge storage circuit Co from the positive input terminal IN110a, as illustrated in FIG. 7. For example, current input from the positive input terminal IN110a is supplied to the electric charge storage circuit Co though the first switch Q111 which is closed, the resonance inductor Lr and the resonance capacitor Cr of the resonance circuit 111, and the first diode D111.

Thus, current supplied from the positive input terminal IN110a, current flowing in the resonance circuit 111, and current supplied to the electric charge storage circuit Co are equal. In other words, as described above, current flowing in the resonance inductor Lr is supplied to the electric charge storage circuit Co as well as to the resonance capacitor Cr, and electric energy supplied from the power supply 10 (refer to FIG. 2) is supplied to the electric charge storage circuit Co as well as to the resonance capacitor Cr.

In addition, while current input from the positive input terminal IN110a passes through the resonance inductor Lr and the resonance capacitor Cr of the resonance circuit 111, the amount of current flowing in the resonance inductor Lr increases and then decreases, and a voltage between opposite ends of the resonance capacitor Cr increases.

As illustrated in FIG. 8, an amount of current ILr flowing in the resonance circuit 111 gradually increases up to time t1 when the amount of the current ILr reaches a highest point after the first switch Q111 is closed, and then, gradually decreases up to time t2 after the amount of the current ILr reaches the highest point.

For example, in the first operation mode, current flowing toward the electric charge storage circuit Co from the positive input terminal IN110a flows in the resonance inductor Lr. As described above, each of the resonance capacitor Cr and the electric charge storage circuit Co outputs a voltage corresponding to half of the input voltage Vi. However, a voltage of the resonance capacitor Cr decreases due to a second operation mode that will be described later, and thus the input voltage Vi is higher than the sum of a voltage of the resonance capacitor Cr and a voltage of the electric charge storage circuit Co. Thus, current flows toward the electric charge storage circuit Co from the positive input terminal IN110a.

In addition, current flowing in the resonance inductor Lr does not rapidly increase and instead gradually increases due to the properties of the resonance inductor Lr whereby a change in current is hindered.

The same current as current flowing in the resonance inductor Lr also flows in the resonance capacitor Cr. While the current flows, electric energy accumulates in the resonance capacitor Cr to increase a voltage of the resonance capacitor Cr.

When the voltage of the resonance capacitor Cr increases such that the sum of the voltage of the resonance capacitor Cr and the voltage of the electric charge storage circuit Co is higher than the input voltage Vi, a voltage in an opposite direction to a current direction between opposite ends of the resonance inductor Lr is applied, and thus the current flowing in the resonance inductor Lr gradually decreases. However, the current flowing in the resonance inductor Lr does not decrease to "0" or less. This is because the first diode D111 prevents current of an opposite direction from flowing.

Figure 10:
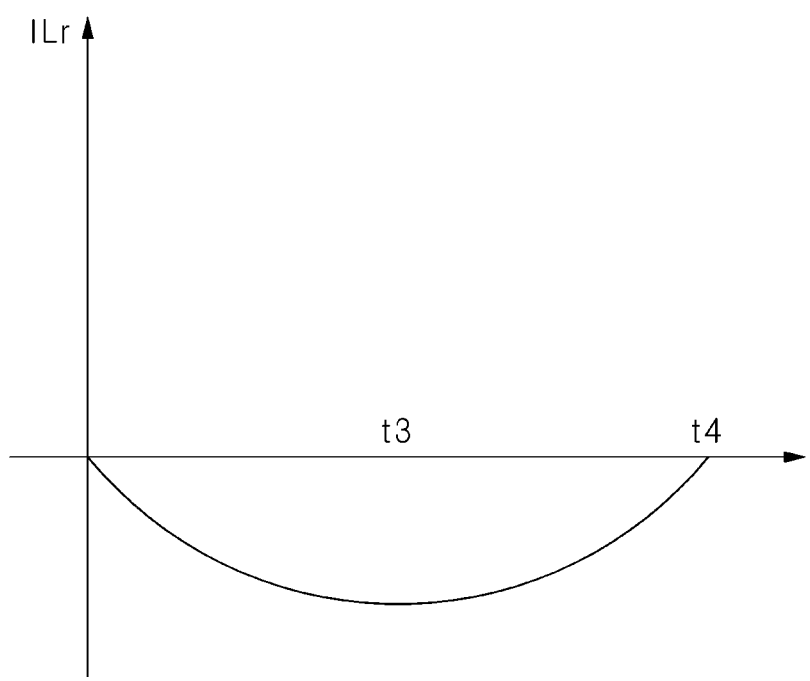
FIG. 10 is a diagram for explanation of a DC component of a voltage applied to the voltage drop circuit unit when a voltage drop circuit unit operates in the second operation mode according to an embodiment.

FIG. 9 illustrates flow of current when the voltage drop circuit unit 110 operates in the second operation mode according to an embodiment. FIG. 10 illustrates an amount of current supplied to the electric charge storage circuit Co when the voltage drop circuit unit 110 operates in the second operation mode according to an embodiment.

When the first switch Q111 is opened and the second switch Q112 is closed, current is supplied to the electric charge storage circuit Co from the resonance capacitor Cr of the resonance circuit 111, as illustrated in FIG. 9. In other words, current flowing in the resonance inductor Lr also flows in the electric charge storage circuit Co from the resonance capacitor Cr, and electric energy is supplied to the electric charge storage circuit Co from the resonance capacitor Cr.

In detail, current input from the resonance capacitor Cr of the resonance circuit 111 is supplied to the electric charge storage circuit Co through the resonance inductor Lr and the second switch Q112 of the resonance circuit 111 and returns to the resonance capacitor Cr of the resonance circuit 111 through the second diode D112. That is, current flows in the resonance circuit 111 in an opposite direction to that in the first operation mode and flows in the electric charge storage circuit Co in the same direction as in the first operation mode.

As illustrated in FIG. 10, an amount of current ILr flowing in the resonance circuit 111 gradually increases in an opposite direction to in the first operation mode up to time t3 when the amount of the current ILr reaches a lowest point after the second switch Q112 is closed, and then, gradually decreases in an opposite direction that of the first operation mode up to time t4 after the amount of the current I111 reaches a highest point.

For example, in the second operation mode, current flowing toward the electric charge storage circuit Co from the resonance capacitor Cr flows in the resonance inductor Lr. As described above, since a voltage of the resonance capacitor Cr has increased in the first operation mode, the voltage of the resonance capacitor Cr is higher than the voltage of the electric charge storage circuit Co. Thus, current flows toward the electric charge storage circuit Co from the resonance capacitor Cr.

In addition, current flowing in the resonance inductor Lr does not rapidly increase and instead gradually increases due to the properties of the resonance inductor Lr whereby a change in current is hindered.

The same current as current flowing in the resonance inductor Lr also flows in the resonance capacitor Cr. While the current flows, the resonance capacitor Cr emits electric energy to reduce a voltage of the resonance capacitor Cr.

When the voltage of the resonance capacitor Cr decreases such that the voltage of the resonance capacitor Cr is lower than the voltage of the electric charge storage circuit Co, a voltage in an opposite direction to a current direction between opposite ends of the resonance inductor Lr is applied, and thus the current flowing in the resonance inductor Lr gradually decreases.

However, the current flowing in the resonance inductor Lr does not decrease to "0" or less. This is because the second diode D112 prevents current of an opposite direction from flowing.

Hereinafter, a change in an output voltage of the voltage drop circuit unit 110 based on time will be described.

Figure 11:
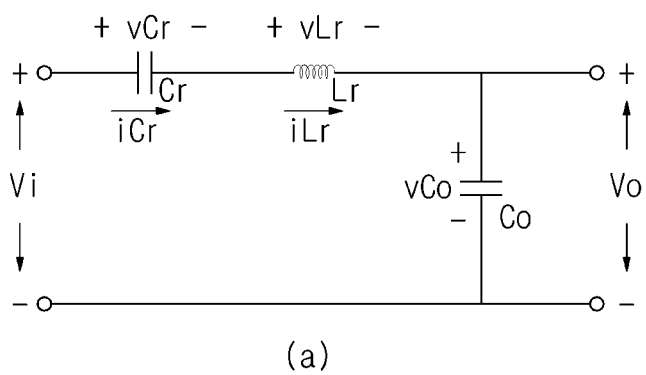
FIG. 11 is a diagram for explanation of an output voltage and current flowing in the voltage drop circuit unit when a voltage drop circuit unit operates in the first operation mode according to an embodiment.
Figure 11:
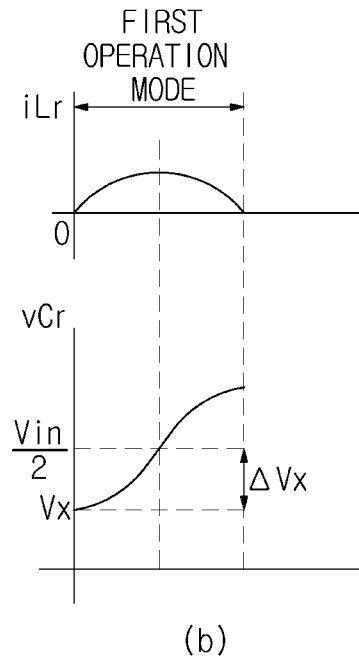

FIG. 11 is a diagram for explanation of an output voltage and current flowing in the voltage drop circuit unit 110 when the voltage drop circuit unit 110 operates in the first operation mode according to an embodiment.

First, a relationship between the resonance capacitor Cr and the resonance inductor Lr in terms of current and a voltage will be described. Current iCr flowing in the resonance capacitor Cr and a voltage vCr applied between opposite ends of the resonance capacitor Cr has a relationship given according to Equation 1 below. Equation 2 below may be given by rewriting Equation 1 below in terms of the voltage vCr applied between opposite ends of the resonance capacitor Cr.

$$i_{Cr} = C_r \frac{dv_{Cr}}{dt} \quad (1)$$

(where iCr is current flowing in a capacitor, Cr is capacitance of the capacitor, vCr is a voltage applied between opposite ends of the capacitor, and d/dt is a differential operator.)

$$V_{Cr} = \frac{1}{C_r} \int i_{Cr} dt + V_x \quad (2)$$

(where Vcr is a voltage applied to the capacitor, Cr is capacitance, icr is current flowing in the capacitor, ∫dt is an integral operator, and Vx is a DC component of a voltage applied to the capacitor.)

Here, ∫iCrdt/Cr refers to an AC component of the voltage applied to the capacitor.

Current iLr flowing in the resonance inductor Lr and a voltage vLr applied between opposite ends of the resonance inductor Lr have a relationship given according to Equation 3 below.

$$v_{Lr} = L_r \frac{di_{Lr}}{dt} \quad (3)$$

(where vLr is a voltage applied between opposite ends of an inductor, Lr is inductance, iLr is current flowing in the inductor, and d/dt is a differential operator.)

Referring to FIG. 11, when the voltage drop circuit unit 110 operates in the first operation mode, an input voltage Vi is equal to the sum of the voltage vCr applied to the resonance capacitor Cr, the voltage vLr applied to the resonance inductor Lr, and the output voltage Vo, according to Equation 4 below. In addition, the current iCr flowing in the resonance capacitor Cr is equal to the current iLr flowing in the resonance inductor Lr.

$$V_i = L_r \frac{di_{Lr}}{dt} + v_{Cr} + V_o + V_x \quad (4)$$

(where $V_i$ is an input voltage, $L_r$ is inductance, $i_{Lr}$ is current flowing in the inductor, d/dt is a differential operator, $v_{Cr}$ is an AC component of a voltage applied to the capacitor, $V_o$ is an output voltage, and $V_x$ is a DC component of a voltage applied to the capacitor.)

Equation 5 below is given by inserting the AC component of the voltage applied to the resonance capacitor Cr shown in Equation 2 above into Equation 4 above.

$$V_i = L_r \frac{di_{Lr}}{dt} + \frac{1}{C_r} \int i_{Lr} dt + V_o + V_x \quad (5)$$

(where Vi is an input voltage, Lr is inductance, iLr is current flowing in the inductor, d/dt is a differential operator, Cr is capacitance, iLr is current flowing in the inductor, ∫dt is an integral operator, Vo is an output voltage, and Vx is a DC component of a voltage applied to the capacitor.)

Equation 6 below is given by applying a Laplace transformation to Equation 5 above.

$$\frac{V_i(s)}{s} = sL_r I_{Lr}(s) + \frac{1}{sC_r} I_{Lr}(s) + \frac{V_o(s)}{s} + \frac{V_x(s)}{s} \tag{6}$$

(where Vi(s) is a Laplace-transformed input voltage, Lr is inductance, ILr(s) is Laplace-transformed current of the inductor, Cr is capacitance, Vo(s) is a Laplace-transformed output voltage, and Vx(s) is a DC component of a Laplace-transformed voltage of the capacitor.)

Equation 7 below is given by rewriting Equation 6 above in terms of Laplace-transformed current ILr(s) of the resonance inductor Lr.

$$I_{Lr}(s) = \frac{C_r}{s^2 L_r C_r + 1} (V_i(s) - V_o(s) - V_x(s)) \tag{7}$$

(where Vi(s) is a Laplace-transformed input voltage, Lr is inductance, ILr(s) is Laplace-transformed current of the inductor, Cr is capacitance, Vo(s) is a Laplace-transformed output voltage, and Vx(s) is a DC component of a Laplace-transformed voltage of the capacitor.)

Equation 8 is given by rewriting Equation 7 above in terms of Laplace-transformed current ILr(s) of the resonance inductor Lr, for inverse Laplace transformation of Equation 7 above.

$$I_{Lr}(s) = \frac{\frac{1}{L_r}}{s^2 + \frac{1}{L_r C_r}} (V_i(s) - V_o(s) - V_x(s)) \tag{8}$$

(where Vi(s) is a Laplace-transformed input voltage, Lr is inductance, ILr(s) is Laplace-transformed current of the inductor, Cr is capacitance, Vo(s) is a Laplace-transformed output voltage, and Vx(s) is a DC component of a Laplace-transformed voltage of the capacitor.)

Equation 9 below is given by rewriting Equation 8 above for inverse Laplace transformation.

$$I_{Lr}(s) = \frac{\frac{1}{\sqrt{L_r C_r}}}{s^2 + \left(\frac{1}{\sqrt{L_r C_r}}\right)^2} \sqrt{\frac{C_r}{L_r}} (V_i(s) - V_o(s) - V_x(s)) \tag{9}$$

(where Vi(s) is a Laplace-transformed input voltage, Lr is inductance, ILr(s) is Laplace-transformed current of the inductor, Cr is capacitance, Vo(s) is a Laplace-transformed output voltage, and Vx(s) is a DC component of a Laplace-transformed voltage of the capacitor.)

Equation 10 below is given by applying an inverse Laplace transformation to Equation 9 above.

$$i_{Lr}(t) = (V_i - V_o - V_x) \sqrt{\frac{C_r}{L_r}} \sin\left(\frac{1}{\sqrt{L_r C_r}} t\right) \tag{10}$$

(where iLr is current flowing in the inductor, Vi is an input voltage, Vo is an output voltage, Vx is a DC component of a voltage applied to the capacitor, Cr is capacitance, and Lr is inductance.)

In order to calculate an amount of current flowing in the resonance inductor Lr or the resonance capacitor Cr, a value of Vx may be defined. As illustrated in FIG. 11, Vx is obtained by subtracting ΔVx from a difference Vi-Vo of the input voltage Vi and the output voltage Vo (for example, in an example embodiment the difference between the input voltage Vi and output voltage Vo corresponds to Vin/2).

ΔVx is now described. ΔVx may refer to an amplitude of an AC component of the resonance capacitor Cr, and multiplication of ΔVx and capacitance may be equal to half of a quantity of charges charged by the current iCr of the resonance capacitor Cr, which is given according to Equation 11 below.

In this case, the iCr of the resonance capacitor Cr is equal to the current iLr of the resonance inductor Lr. A value obtained by integrating the current iCr of the resonance capacitor Cr for a period of time Ts/2 of the first operation mode is equal to a value obtained by multiplying the average current Iin flowing in the resonance inductor Lr in the first operation mode and the period of time Ts/2 in the first operation mode (the average current Iin flowing in the resonance inductor Lr is equal to the average current input to the voltage drop circuit unit 110). In addition, when the sum of the operation time the voltage drop controller 120 in the first operation mode and the operation time in the second operation mode is equal to a resonance period of the resonance circuit 111, a value obtained by doubling the operation time in the first operation mode is equal to the resonance period Ts, which corresponds to the reciprocal of the resonance frequency f.

$$\Delta V_x = \frac{1}{C_r} \int_0^{\frac{T_s}{2}} i_{Lr}(t) dt = \frac{1}{C_r} \frac{T_s}{2} I_{in} = \frac{1}{2 C_r f} I_{in} \tag{11}$$

(where ΔVx is the amplitude of an AC component of the resonance capacitor Cr, Cr is capacitance, iLr is current flowing in the inductor and the capacitor, Ts/2 is the operation time in the first operation mode, ∫dt is an integral operator, Iin is the average current input to a voltage drop circuit unit, and f is a resonance frequency of a resonance circuit.)

Equation 12 below is given by calculating a DC component Vx of the voltage of the resonance capacitor Cr using Equation 11 above.

$$V_x = V_i - V_o - \frac{1}{2 C_r f} I_{in} \tag{12}$$

(where Vx is a DC component of a voltage applied to the capacitor, Vi is an input voltage, Vo is an output voltage, Cr is capacitance, f is a resonance frequency, and Iin is the average current input to a voltage drop circuit unit.)

Equation 13 is given by inserting Equation 12 above into Equation 10 above.

Equation 13

$$i_{Lr}(t) = \frac{1}{2 C_r f} I_{in} \sqrt{\frac{C_r}{L_r}} \sin\left(\frac{1}{\sqrt{L_r C_r}} t\right)$$

(where iLr is current flowing in the inductor and the capacitor, Cr is capacitance, Lr is inductance, f is a resonance frequency of a resonance circuit, and Iin is the average current input to a voltage drop circuit unit.)

The voltage vCr applied to the resonance capacitor Cr is given according to Equation 14 below and is obtained by inserting Equation 13 above into Equation 2 above.

$$V_{Cr} = \frac{1}{C_r}\int\left[\frac{I_{in}}{2C_r f}\sqrt{\frac{C_r}{L_r}}\sin\left(\frac{1}{\sqrt{L_r C_r}}t\right)\right]dt + V_x \quad (14)$$
$$= -\frac{I_{in}}{2C_r f}\cos\left(\frac{1}{\sqrt{L_r C_r}}t\right) + \frac{V_i}{2}$$

(where Vcr is a voltage applied to the capacitor, Iin is the average current input to a voltage drop circuit unit, Cr is capacitance, Lr is inductance, f is a resonance frequency of a resonance circuit, and Vi is an input voltage.)

When the voltage drop circuit unit 110 operates in the second operation mode, current of the resonance inductor Lr and the resonance capacitor Cr and a voltage of the resonance capacitor Cr may also be calculated using the aforementioned method.

Figure 12:
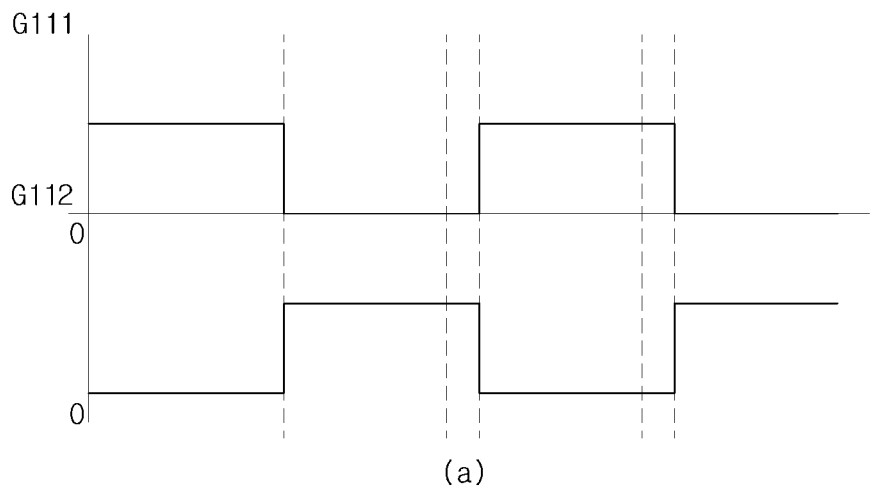
FIG. 12 illustrates current and a voltage of a voltage drop circuit unit according to an example of a voltage drop control signal of the voltage drop controller according to an embodiment.
Figure 12:
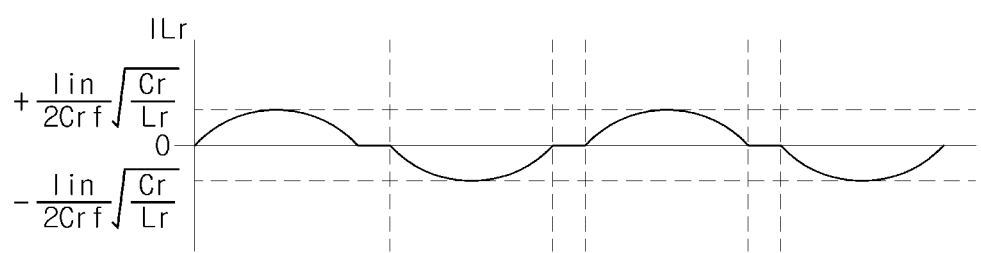
Figure 12:
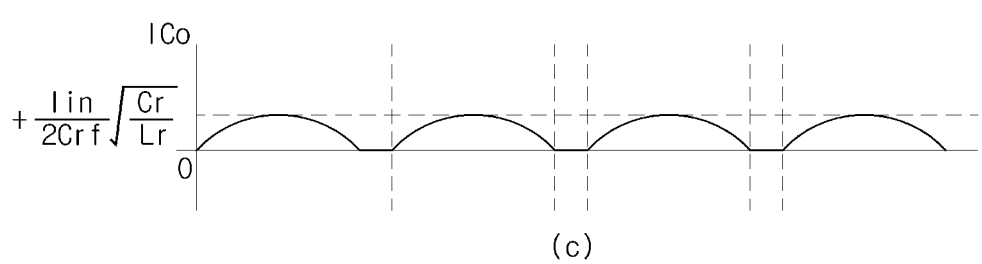
Figure 12:
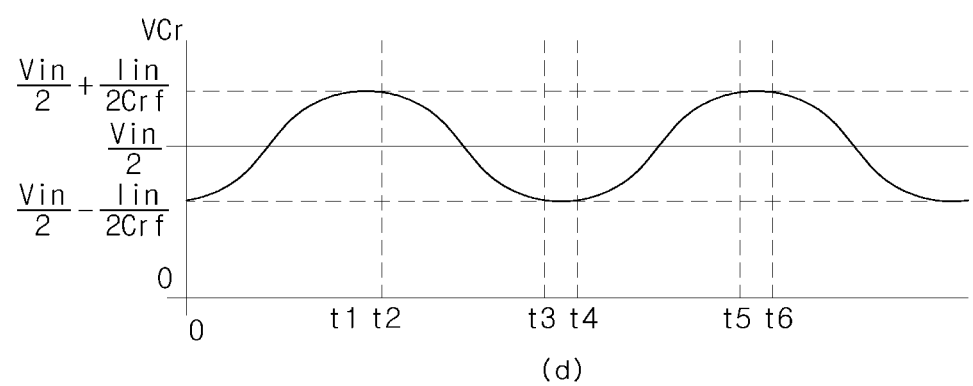

FIG. 12 illustrates a current and a voltage of the voltage drop circuit unit 110 according to an example embodiment of a voltage drop control signal of the voltage drop controller 120. For example, FIG. 12(a) illustrates an example of a first voltage drop control signal G111 for opening and closing of the first switch Q111 and a second voltage drop control signal G112 for opening and closing of the second switch Q112. FIG. 12(b) illustrates current ILr flowing in the resonance inductor Lr of the resonance circuit 111, FIG. 12(c) illustrates current ICo supplied to the electric charge storage circuit Co, and FIG. 12(d) illustrates a voltage VCr of the resonance capacitor Cr, according to the first and second voltage drop control signals G111 and G112 shown in FIG. 12(a).

Referring to FIG. 12, a period of each of the first and second voltage drop control signals G111 and G112 output to the voltage drop controller 120 is slightly longer than a resonance period of the resonance circuit 111 included in the voltage drop circuit unit 110.

For example, the voltage drop controller 120 outputs the first voltage drop control signal G111 so as to close the first switch Q111 and outputs the second voltage drop control signal G112 so as to open the second switch Q112 between 0 and t2. Then, the voltage drop controller 120 outputs the first voltage drop control signal G111 so as to open the first switch Q111 and outputs the second voltage drop control signal G112 so as to close the second switch Q112 between t2 and t4. That is, the voltage drop controller 120 outputs the first and second voltage drop control signals G111 and G112 in the form of a square wave with a period of 2×t1.

In addition, current in the form of a positive sine wave flows in the resonance inductor Lr between 0 and t1, current does not flow between t1 and t2, current in the form of a negative sine wave flows between t2 and t3, and current does not flow between t3 and t4. That is, a resonance period of the resonance circuit 111 is 2×t1. Current of a positive direction and current of a negative direction alternately flow in the resonance circuit 111. However, current of a positive direction always flows in the electric charge storage circuit Co. This is based on opening and closing operations of the first switch Q111 and the second switch Q112 and rectifying functions of the first diode D111 and the second diode D112.

Thus, when the first and second switches Q111 and Q112 are switched according to the first and second voltage drop control signals G111 and G112 of the voltage drop controller 120, zero current switching by which current does not flow in the voltage drop circuit unit 110 is possible.

When periods of the first and second voltage drop control signals G111 and G112 output from the voltage drop controller 120 are each the same or similar as a resonance period of the resonance circuit 111 included in the voltage drop circuit unit 110, electric charges are continuously supplied to the electric charge storage circuit Co according to resonance of the resonance circuit 111 and the output voltage Vo may be maintained at half the input voltage Vi.

In addition, the voltage VCr of the resonance capacitor Cr varies according to the current iCr of the resonance capacitor Cr, as illustrated in FIG. 12(d).

Figure 13:
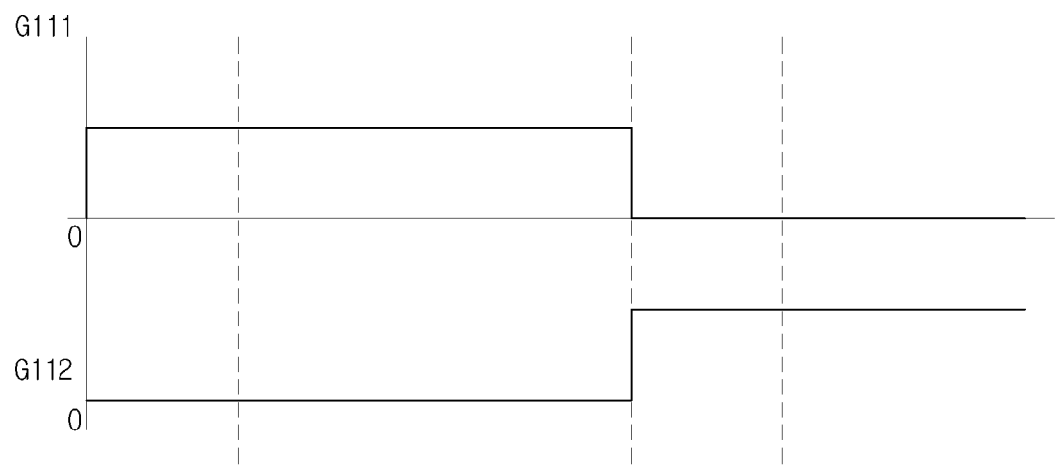
FIG. 13 illustrates current of a voltage drop circuit unit according to another example of a voltage drop control signal of the voltage drop controller according to an embodiment.
Figure 13:
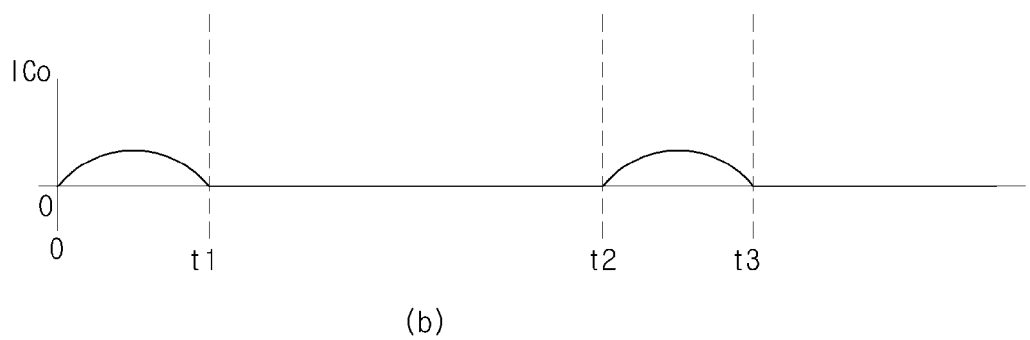

FIG. 13 illustrates a current of the voltage drop circuit unit 110 according to another example of a voltage drop control signal of the voltage drop controller 120 according to an embodiment. For example, FIG. 13(a) illustrates another example of the first voltage drop control signal G111 and second voltage drop control signal G112. FIG. 13(b) illustrates current supplied to the electric charge storage circuit Co according to the first and second voltage drop control signals G111 and G112 shown in FIG. 13(a).

As seen from FIG. 13(a), a period 2×t2 of each of the first and second voltage drop control signals G111 and G112 output from the voltage drop controller 120 is significantly longer than a resonance period 2×t2 of the resonance circuit 111 included in the voltage drop circuit unit 110.

As seen from FIG. 13(b), current is supplied to the electric charge storage circuit Co of the voltage drop circuit unit 110 for a time corresponding to half of the resonance period of the resonance circuit 111 after the first switch Q111 or the second switch Q112 is turned on according to the first and second voltage drop control signals G111 and G112.

As a result, compared with the case shown in FIG. 12(c) a small amount of electric charges is supplied to the electric charge storage circuit Co, the output voltage Vo of the electric charge storage circuit Co is not maintained at half of the input voltage Vi, and the electric charge storage circuit Co outputs a lower voltage than half of the input voltage Vi.

Figure 14:
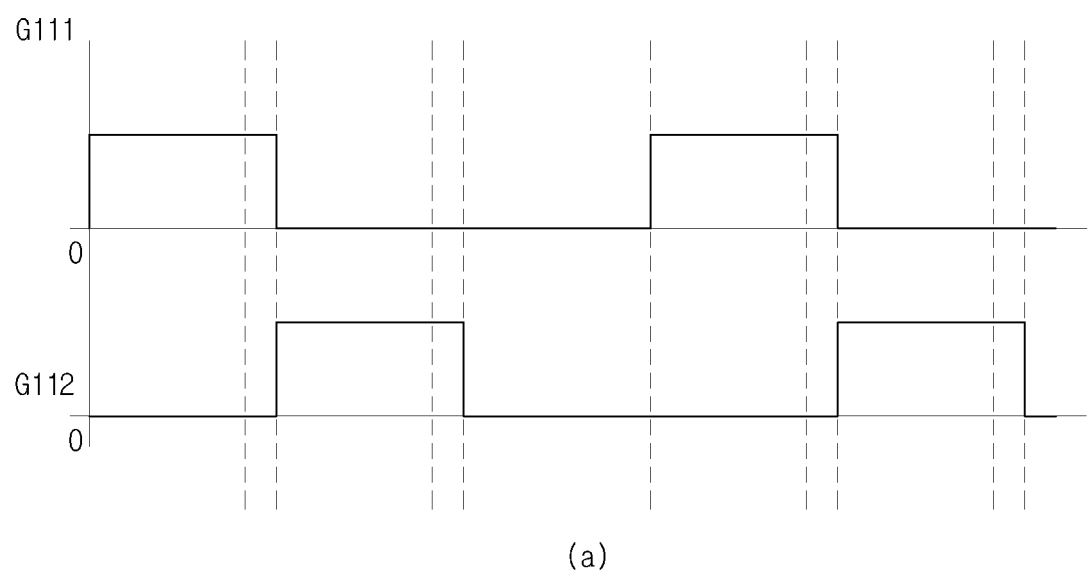
FIG. 14 illustrates current of a voltage drop circuit unit according to another example of a voltage drop control signal of the voltage drop controller according to an embodiment.
Figure 14:
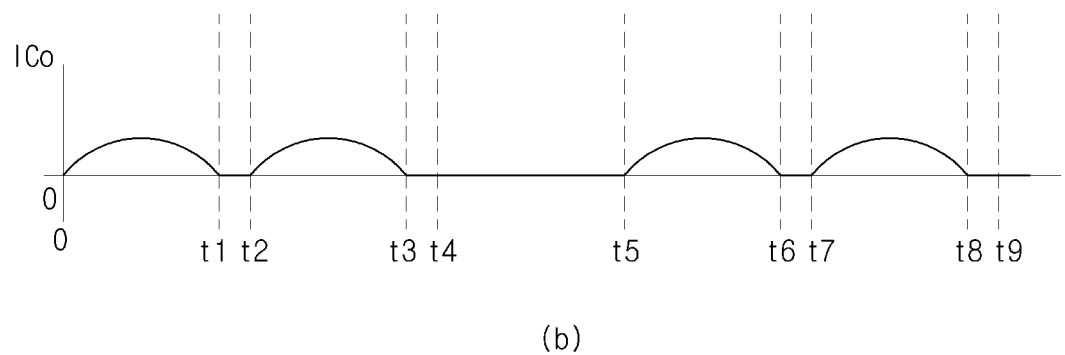

FIG. 14 illustrates a current of the voltage drop circuit unit 110 according to another example embodiment of a voltage drop control signal of the voltage drop controller 120. For example, FIG. 14(a) illustrates another example of the first voltage drop control signal G111 and second voltage drop control signal G112. FIG. 14(b) illustrates current supplied to the electric charge storage circuit Co according to the first and second voltage drop control signals G111 and G112 shown in FIG. 14(a).

Referring to FIG. 14(a), the first and second voltage drop control signals G111 and G112 output from the voltage drop controller 120 turn on the first and second switches Q111 and Q112 for a similar time corresponding to half of the resonance period of the resonance circuit 111 included in the voltage drop circuit unit 110. For example, as shown in FIG. 14(a), from time t0 to t2 the first voltage drop control signal G111 is output from the voltage drop controller 120, from time t2 to t4 the second voltage drop control signal G112 is output, and from time t4 to t5 no voltage drop control signal is output.

Referring to FIG. 14(b), resonance current is supplied to the electric charge storage circuit Co while the first and second switches Q111 and Q112 are turned on. However, for a configurable time after the first and second switches Q111 and Q112 are alternately turned on, no voltage drop control signal is output, and in the meantime, current is not supplied to the electric charge storage circuit Co (for example, from time t4 to t5).

As a result, compared with the case shown in FIG. 12(c), a small amount of electric charges are supplied to the electric charge storage circuit Co, the output voltage Vo of the electric charge storage circuit Co is not maintained at half of the input voltage Vi, and the electric charge storage circuit Co outputs a lower voltage than half of the input voltage Vi.

Figure 15:
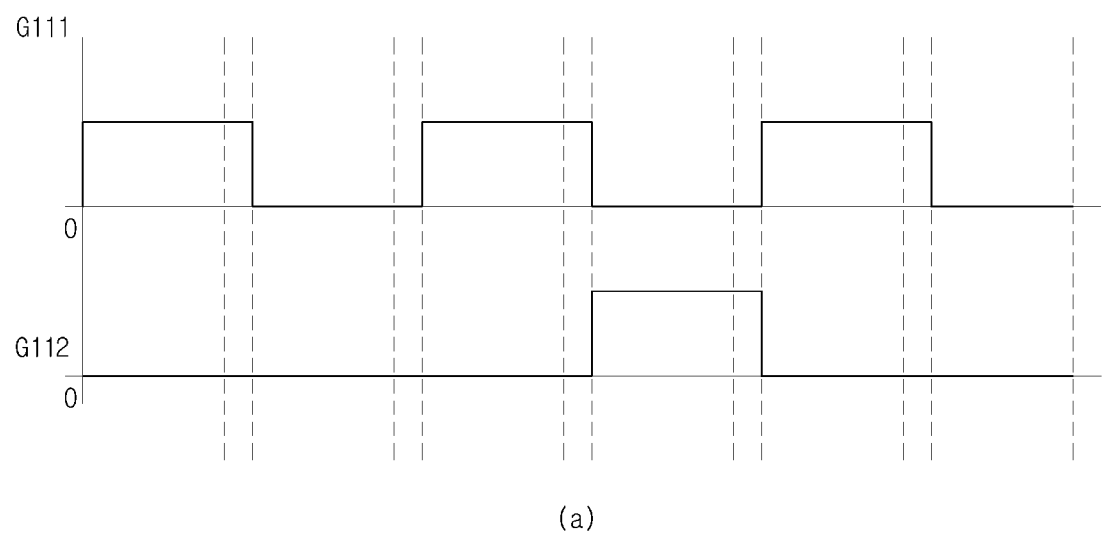
FIG. 15 illustrates current of a voltage drop circuit unit according to another example of a voltage drop control signal of the voltage drop controller according to an embodiment.
Figure 15:
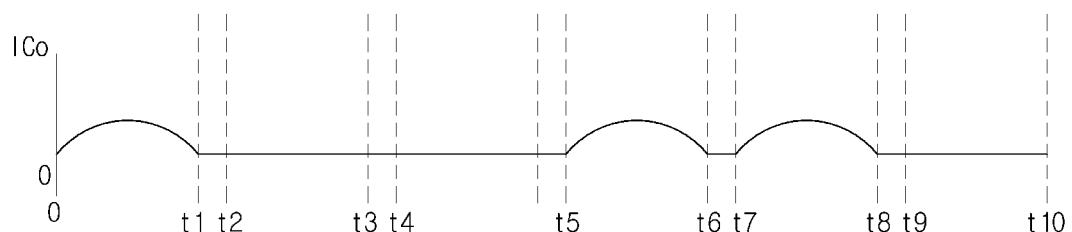

FIG. 15 illustrates current of the voltage drop circuit unit 110 according to another example embodiment of a voltage drop control signal of the voltage drop controller 120. For example, FIG. 15(a) illustrates another example of the first voltage drop control signal G111 and second voltage drop control signal G112. FIG. 15(b) illustrates current supplied to the electric charge storage circuit Co according to the first and second voltage drop control signals G111 and G112 shown in FIG. 15(a).

Referring to FIG. 15(a), the first switch Q111 is repeatedly turned on and off at a similar period to the resonance period of the resonance circuit 111. In particular, the second switch Q112 is turned on once while the first switch Q111 is turned on twice. For example, as shown in FIG. 15(a), from time t0 to t2 the first voltage drop control signal G111 is output from the voltage drop controller 120, from time t4 to t5 the first voltage drop control signal G111 is again output from the voltage drop controller 120, and from time t5 to t7 the second voltage drop control signal G112 is output. Also, from time t2 to t3 no voltage drop control signal is output.

Referring to FIG. 15(b), current is supplied to the electric charge storage circuit Co when the second switch Q112 is turned on and when the first switch Q111 is turned on immediately after the second switch Q112 is turned on. For example, the first switch Q111 is turned on between 0 and t2 and thus current is supplied to the electric charge storage circuit Co, and the second switch Q112 is not turned on between t2 and t4 and thus current is not supplied to the electric charge storage circuit Co. In addition, the first switch Q111 is turned on between t4 and t5 but current is not supplied to the electric charge storage circuit Co. This is because the second switch Q112 is not turned on between t2 and t4. In addition, the second switch Q112 is turned on between t5 and t7 and thus current is supplied to the electric charge storage circuit Co, and the first switch Q111 is also turned on between t7 and t9 and thus current is supplied to the electric charge storage circuit Co.

As a result, compared with the case shown in FIG. 12(c), a small amount of electric charges are supplied to the electric charge storage circuit Co, the output voltage Vo of the electric charge storage circuit Co is not maintained at half of the input voltage Vi, and the electric charge storage circuit Co outputs a lower voltage than half of the input voltage Vi.

Thus far, a voltage drop circuit unit and a voltage drop controller have been described with regard to example embodiments. Hereinafter, a voltage drop circuit unit and a voltage drop controller will be described with regard to other example embodiments. In addition, a detailed description of various components or circuit elements of a power supply using the voltage drop circuit unit and the voltage drop controller (e.g., a rectifier circuit, a smoothing circuit, etc.) will not be repeated below for the sake of brevity, but these other components/circuit elements may also be incorporated into any of the example embodiments disclosed herein.

Figure 16:
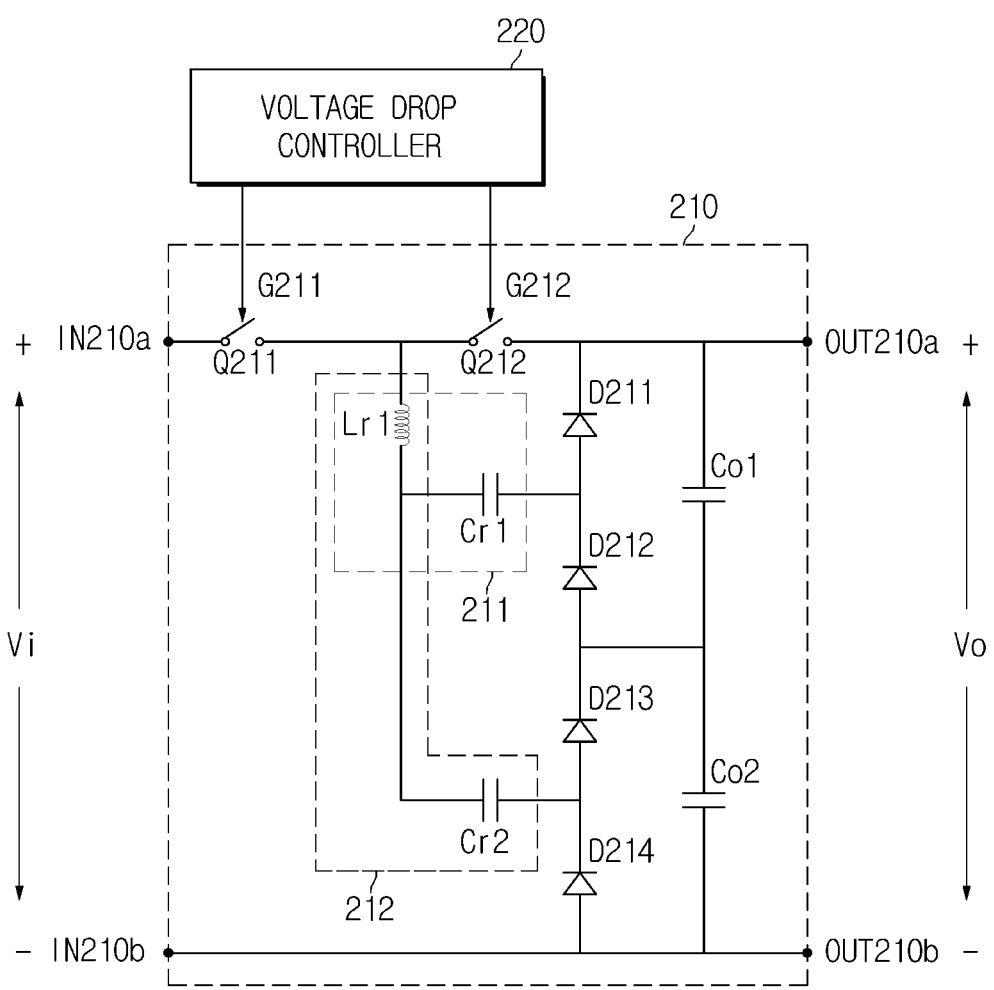
FIG. 16 illustrates a voltage drop circuit unit and a voltage drop controller according to another embodiment.

FIG. 16 illustrates a voltage drop circuit unit 210 and a voltage drop controller 220 according to another embodiment.

The voltage drop circuit unit 210 drops a DC voltage and the voltage drop controller 220 supplies a voltage drop control signal to the voltage drop circuit unit 210.

Referring to FIG. 16, the voltage drop circuit unit 210 may include a pair of input terminals IN210a and IN210b to receive a DC voltage, a pair of output terminals OUT210a and OUT210b to output a voltage-dropped DC voltage, a first switch Q211 and a second switch Q212 that are connected in series to each other between a positive input terminal IN210a and a positive output terminal OUT210a, and a first electric charge storage circuit Co1 and a second electric charge storage circuit Co2 that are connected to each other in series between the pair of output terminals OUT210a and OUT210b. The voltage drop circuit unit 210 may further include a first diode D211 and a second diode D212 that are connected in series to each other between opposite ends of the first electric charge storage circuit Co1, a third diode D213 and a fourth diode D214 that are connected in series to each other between opposite ends of the second electric charge storage circuit Co2, a first resonance circuit 211 disposed between a node to which the first switch Q211 and the second switch Q212 are connected and a node to which the first diode D211 and the second diode D212 are connected, and a second resonance circuit 212 disposed between a node to which the first switch Q211 and the second switch Q212 are connected and a node to which the third diode D213 and the fourth diode D214 are connected. The first resonance circuit 211 and the second resonance circuit 212 may share one resonance inductor Lr1. That is the first resonance circuit 211 may include resonance inductor Lr1 and the second resonance circuit 212 may also include resonance inductor Lr1. For example, as shown in FIG. 16, a first end of the first resonance circuit 211 may be connected to a first node disposed between the first switch Q211 and second switch Q212, and a second end of the first resonance circuit 211 may be connected to a second node disposed between the first diode D211 and second diode D212. The first node of the first resonance circuit 211 may be connected to resonance inductor Lr1 while the second node of the first resonance circuit 211 may be connected to a first resonance capacitor Cr1. For example, as shown in FIG. 16, a first end of the second resonance circuit 212 may be connected to the first node disposed between the first switch Q211 and second switch Q212, and a second end of the second resonance circuit 212 may be connected to a third node disposed between the third diode D213 and fourth diode D214. The first node of the second resonance circuit 212 may be connected to resonance inductor Lr1 while the third node of the second resonance circuit 212 may be connected to a second resonance capacitor Cr2.

The first switch Q211 and the second switch Q212 interrupt flow of current supplied to the output terminals OUT210a and OUT210b from the input terminals IN210a and IN210b. For example, the first switch Q211 interrupts current supplied to the first resonance circuit 211 and the second resonance circuit 212 from the input terminals IN210a and IN210b. The second switch Q212 interrupts current supplied to the first electric charge storage circuit Co1 and the second electric charge circuit Co2 from the first resonance circuit 211 and the second resonance circuit 212.

For example, the first switch Q211 and the second switch Q212 may employ an insulated gate bipolar transistor (IGBT) or a field effect transistor (FET) for allowing high voltage and high current to be shut off or to flow.

The first resonance circuit 211 may include the resonance inductor Lr1 to store magnetic energy and a first resonance capacitor Cr1 to store electric energy. The resonance inductor Lr1 and the first resonance capacitor Cr1 may be connected to each other in series. The second resonance circuit 212 may include the resonance inductor Lr1 to store magnetic energy and a second resonance capacitor Cr2 to store electric energy. The resonance inductor Lr1 and the second resonance capacitor Cr2 may be connected in series to each other. The first resonance circuit 211 and the second resonance circuit 212 share one resonance inductor Lr1, as illustrated in FIG. 16.

The first diode D211 and the second diode D212 guide current so as to supply electric charges to the first electric charge storage circuit Co1. The third diode D213 and the fourth diode D214 guide current so as to supply electric charges to the second electric charge circuit Co2.

The first electric charge storage circuit Co1 and the second electric charge circuit Co2 store electric charges through current supplied from the input terminals IN210a and IN210b and output a voltage that is dropped compared with electric charges supplied to the input terminals IN210a and IN210b, to the output terminals OUT210a and OUT210b.

The voltage drop controller 220 generates a first voltage drop control signal G211 and a second voltage drop control signal G212 that control opening and closing of the first switch Q211 and second switch Q212 included in the voltage drop circuit unit 210 such that the voltage drop circuit unit 210 outputs a predetermined voltage, and supplies the generated first voltage drop control signal G211 and second voltage drop control signal G212 to the voltage drop circuit unit 210.

According to the control signal of the voltage drop controller 220, the voltage drop circuit unit 210 may operate in two modes. For example, the voltage drop circuit unit 210 may operate in a first operation mode in which the first switch Q211 is closed and the second switch Q212 is opened, and a second operation mode in which the first switch Q211 is opened and the second switch Q212 is closed.

First, a voltage drop by the voltage drop circuit unit 210 will be described below.

Figure 17:
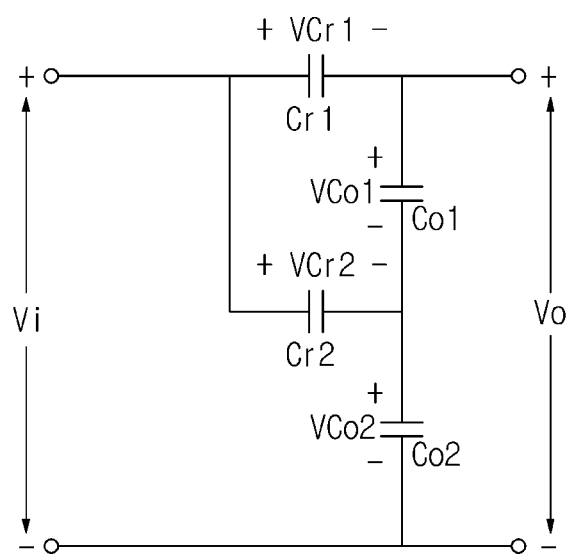
FIG. 17 illustrates flow of current when a voltage drop circuit unit operates in the first operation mode according to another embodiment.
Figure 18:
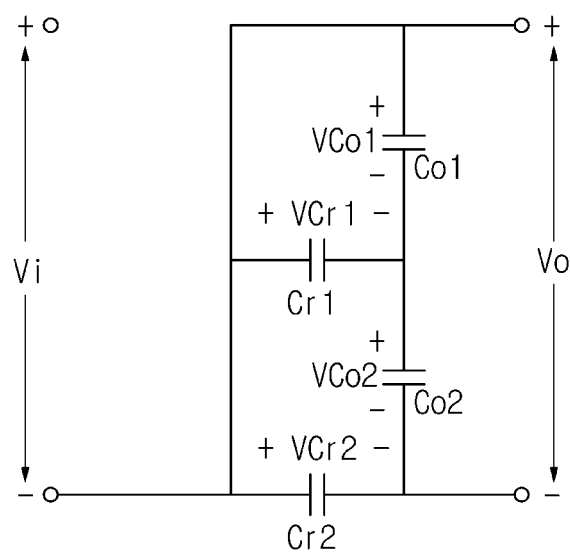
FIG. 18 illustrates flow of current when the voltage drop circuit unit operates in the second operation mode according to another embodiment.

FIG. 17 is a diagram for explanation of a DC component of a voltage applied to the voltage drop circuit unit 210 when the voltage drop circuit unit 210 operates in a first operation mode according to another embodiment. FIG. 18 is a diagram for explanation of a DC component of a voltage applied to the voltage drop circuit unit 210 when the voltage drop circuit unit 210 operates in a second operation mode according to another embodiment.

As illustrated in FIGS. 17 and 18, the voltage drop circuit unit 210 may be illustrated as a simple circuit including the first and second resonance capacitors Cr1 and Cr2 and the first and second electric charge storage circuits Co1 and Co2.

In the first operation mode (see, e.g., FIG. 17), according to Equation 15 below, an input voltage Vi is equal to the sum of a voltage VCr2 of the second resonance capacitor Cr2 and a voltage VCo2 of the second electric charge circuit Co2. A voltage VCr1 of the first resonance capacitor Cr1 is equal to the sum of a voltage VCo1 of the first electric charge storage circuit Co1 and a voltage VCr2 of the second resonance capacitor Cr2. Likewise, a voltage VCr2 of the second resonance capacitor Cr2 is equal to the sum of a voltage VCr1 of the first resonance capacitor Cr1 and a voltage VCo1 of the first electric charge storage circuit Co1. Thus, with substitution, the input voltage Vi may also be equal to the sum of a voltage VCr1 of the first resonance capacitor Cr1, a voltage VCo1 of the first electric charge storage circuit Co1, and a voltage VCo2 of the second electric charge circuit Co2.

$$V_I = V_{Cr2} + V_{Co2}$$

$$V_{Cr1} + V_{Co1} + V_{Co2} \quad (15)$$

(where Vi is an input voltage, VCr1 is a voltage of a first capacitor, VCr2 is a voltage of a second capacitor, VCo1 is a voltage of a first electric charge storage circuit, and VCo2 is a voltage of a second electric charge storage circuit.)

In the second operation mode (see, e.g., FIG. 18), according to Equation 16 below, the voltage VCr1 of the first resonance capacitor Cr1 is equal to the voltage VCo1 of the first electric charge storage circuit Co1, and according to Equation 17 below, the voltage VCr2 of the second resonance capacitor Cr2 is equal to the sum of the voltage VCo1 of the first electric charge storage circuit Co1 and the voltage VCo2 of the second electric charge circuit Co2.

$$V_{Cr1} = V_{Co1} \quad (16)$$

(where VCr1 is a voltage of the first capacitor and VCo1 is a voltage of a first electric charge storage circuit.)

$$V_{Cr2} = V_{Co1} + V_{Co2} \quad (17)$$

(where VCr2 is a voltage of the second capacitor, VCo1 is a voltage of the first electric charge storage circuit, and VCo2 is a voltage of the second electric charge storage circuit.)

The input voltage Vi is given according to Equation 18 below by combining Equations 16 and 17 above.

$$V_I = V_{Co1} + 2V_{Co2}$$

$$2V_{Co1} + V_{Co2} \quad (18)$$

(where Vi is an input voltage, VCo1 is a voltage of the first electric charge storage circuit, and VCo2 is a voltage of the second electric charge storage circuit.)

In addition, according to Equation 18 above, the voltage VCo1 of the first electric charge storage circuit Co1 and the voltage VCo2 of the second electric charge circuit Co2 are given according to Equation 19 below.

$$V_{Co1} = V_{Co2} = \tfrac{1}{3} V_I \quad (19)$$

($V_I$ is an input voltage, $V_{Co1}$ is a voltage of the first electric charge storage circuit, and $V_{Co2}$ is a voltage of the second electric charge storage circuit.)

The output voltage Vo is equal to the sum of the voltage VCo1 of the first electric charge storage circuit Co1 and the voltage VCo2 of the second electric charge storage circuit Co2, which corresponds to ⅔ of the input voltage Vi. That is, the voltage drop circuit unit 210 of FIG. 16 outputs ⅔ of the input voltage Vi.

Hereinafter, the flow of current in the voltage drop circuit unit 210 when the voltage drop circuit unit 210 operates in the first operation mode and the second operation mode will be described.

Figure 19:
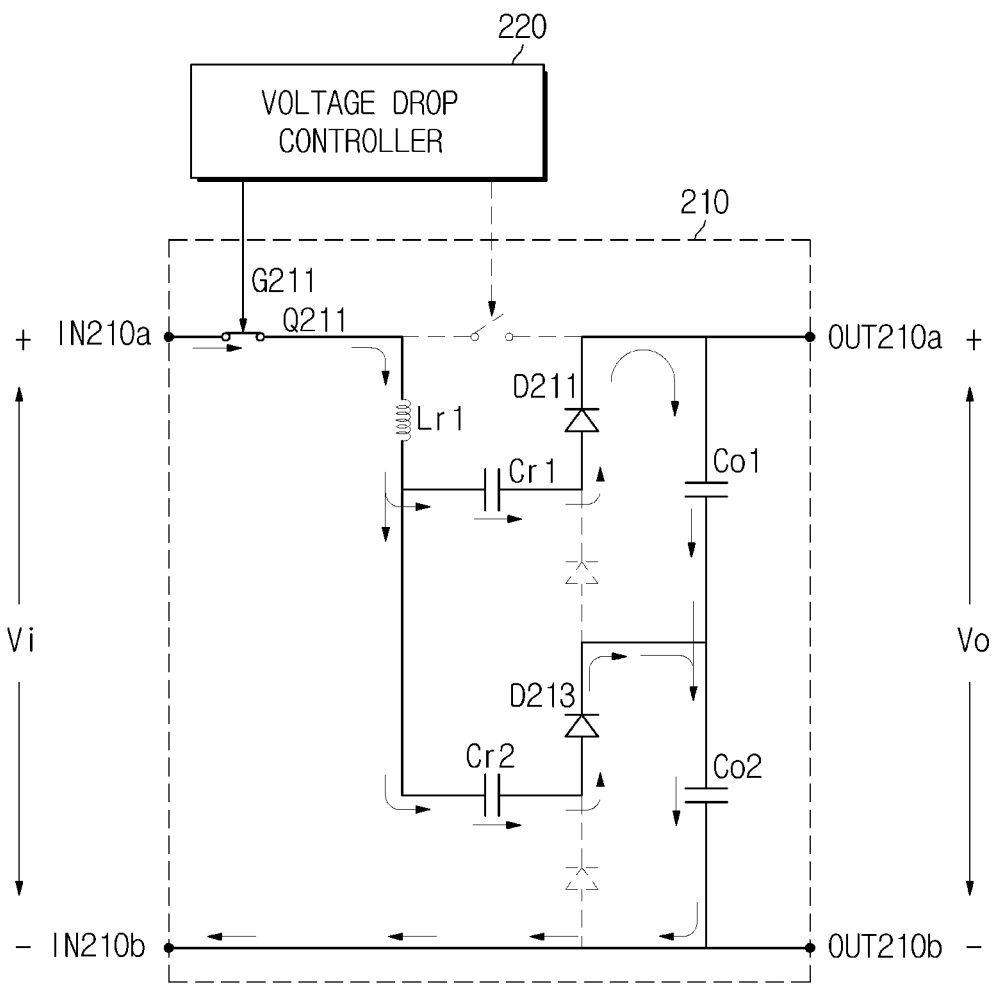
FIG. 19 is a diagram for explanation of a DC component of a voltage applied to the voltage drop circuit unit when a voltage drop circuit unit operates in the first operation mode according to another embodiment.

FIG. 19 illustrates the flow of current when the voltage drop circuit unit 210 operates in the first operation mode according to an embodiment.

Referring to FIG. 19, current is supplied from the positive input terminal IN210a in the first operation mode. Some of the current supplied from the positive input terminal IN210a is supplied to the first electric charge storage circuit Co1 through the first switch Q211, the resonance inductor Lr1 and the first resonance capacitor Cr1 of the first resonance circuit 211, and the first diode D211. The remaining current is supplied to the second electric charge circuit Co2 through the first switch Q211 that is closed, the resonance inductor Lr1 and the second resonance capacitor Cr2 of the second resonance circuit 212, and the third diode D213.

In the first operation mode, current flowing in the resonance inductor Lr1 and the first and second resonance capacitors Cr1 and Cr2 gradually increase and then gradually decrease. In addition, electric energy accumulates in the first and second resonance capacitors Cr1 and Cr2, and thus voltages of the first and second resonance capacitors Cr1 and Cr2 gradually increase.

Figure 20:
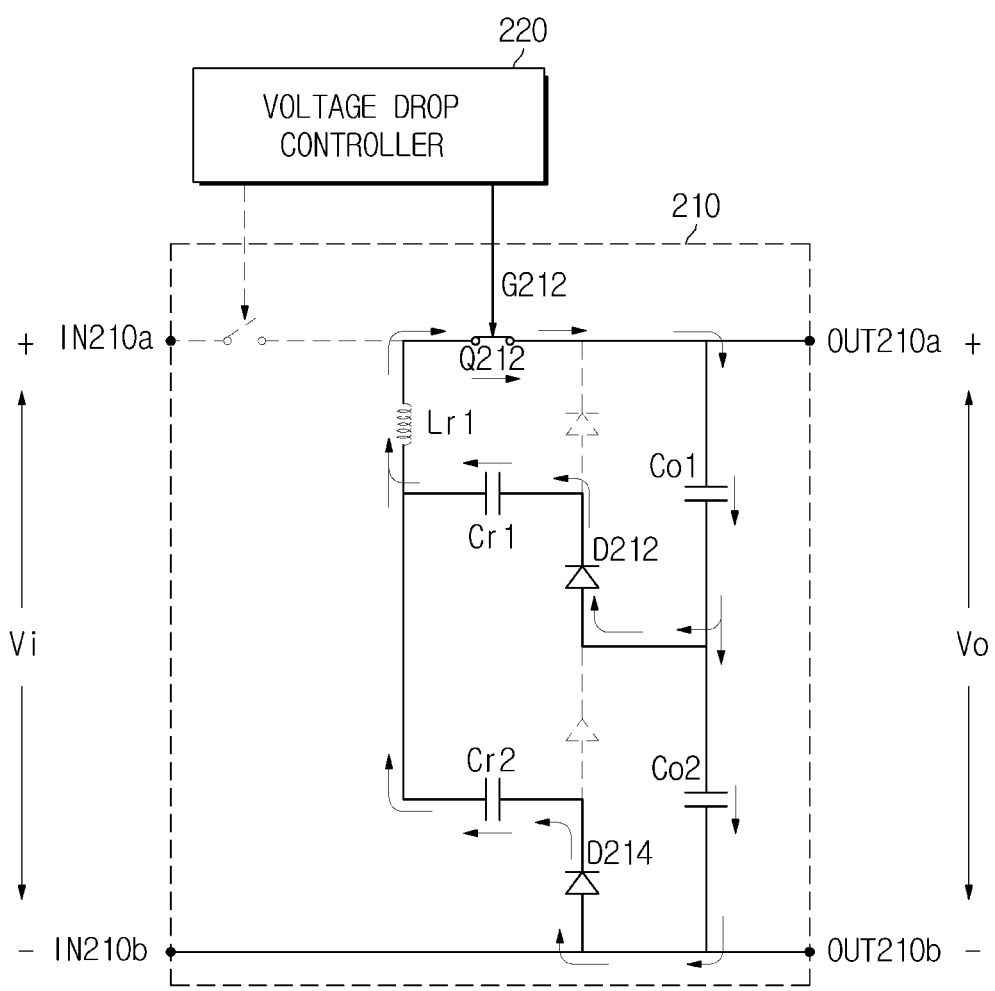
FIG. 20 is a diagram for explanation of a DC component of a voltage applied to the voltage drop circuit unit when a voltage drop circuit unit operates in the second operation mode according to another embodiment.

FIG. 20 illustrates the flow of current when the voltage drop circuit unit 210 operates in the second operation mode according to an embodiment.

Referring to FIG. 20, current is supplied from the first and second resonance capacitors Cr1 and Cr2 in the second operation mode. The current supplied from the first resonance capacitor Cr1 is supplied to the first electric charge storage circuit Co1 through the resonance inductor Lr1 and the second switch Q212 and returns to the first resonance capacitor Cr1 through the second diode D212. The current supplied from the second resonance capacitor Cr2 is supplied to the second electric charge circuit Co2 through the resonance inductor Lr1, the second switch Q212, and the first electric charge storage circuit Co1 and returns to the second resonance capacitor Cr2 through the fourth diode D214.

In the second operation mode, a direction of current flowing in the resonance inductor Lr1 and the first and second resonance capacitors Cr1 and Cr2 is opposite to that in the first operation mode, and the amount of the current gradually increases and then gradually decreases. In addition, the first and second resonance capacitors Cr1 and Cr2 emit electric energy to gradually reduce voltages of the first and second resonance capacitors Cr1 and Cr2.

Figure 21:
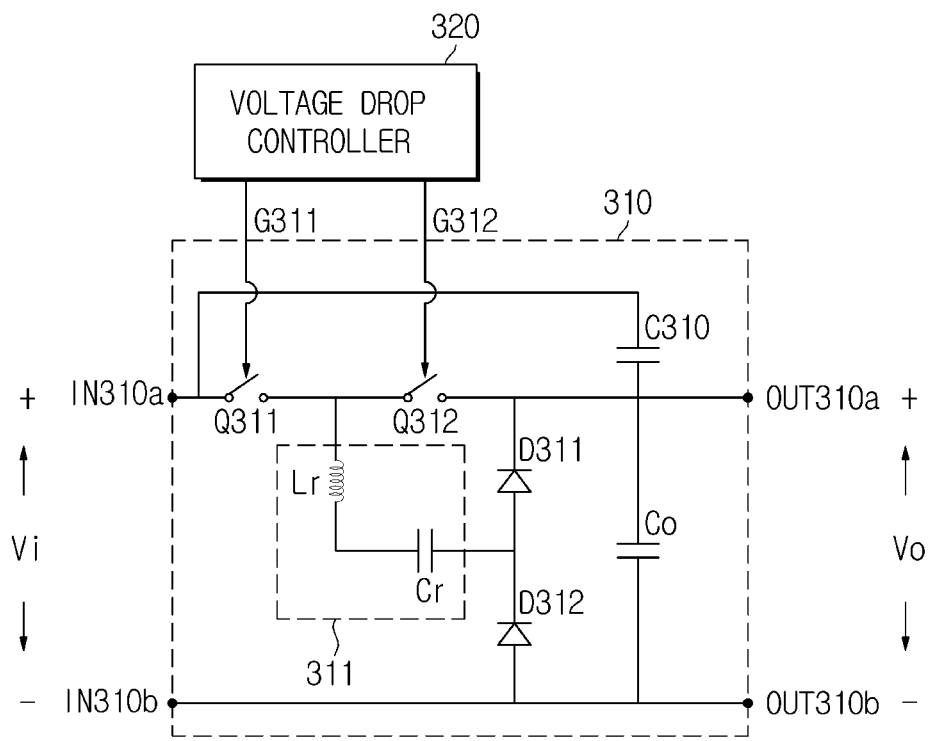
FIG. 21 illustrates a voltage drop circuit unit and a voltage drop controller according to another embodiment.

FIG. 21 illustrates a voltage drop circuit unit 310 and a voltage drop controller 320 according to another embodiment.

Referring to FIG. 21, the voltage drop circuit unit 310 and the voltage drop controller 320 are provided.

The voltage drop circuit unit 310 may include a first switch Q311 and a second switch Q312, an electric charge storage circuit Co, a first diode D311 and a second diode D312, a resonance circuit 311, and an initial charging capacitor C310. That is, the voltage drop circuit unit 310 and a voltage drop controller 320 may be arranged or configured in a similar manner as that shown in FIG. 4, with the addition of the initial charging capacitor C310.

The first switch Q311 and the second switch Q312 may be disposed between input terminals IN310a and IN320b to receive DC power and output terminals OUT310a and OUT310b to output a voltage-dropped DC voltage and may be connected in series to each other. In addition, the first switch Q311 interrupts current input to the resonance circuit 311 and the second switch Q312 interrupts current output from the resonance circuit 311.

The electric charge storage circuit Co may be disposed between the output terminals OUT310a and OUT310b and outputs a voltage-dropped voltage.

The first diode D311 and the second diode D312 may be disposed between opposite ends of the electric charge storage circuit Co and may be connected in series to each other. The first diode D311 allows current to flow to the electric charge storage circuit Co from the input terminal IN310a through the resonance circuit 311, but shuts off current in an opposite direction. In addition, the second diode D312 allows current to flow to the electric charge storage circuit Co from the resonance circuit 311 but shuts off current in an opposite direction.

The resonance circuit 311 is disposed between a node to which the first switch Q311 and the second switch Q312 are connected and a node to which the first diode D311 and the second diode D312 are connected and includes the resonance inductor Lr and the resonance capacitor Cr that are connected in series to each other. For example, as shown in FIG. 21, a first end of the resonance circuit 311 may be connected to a first node disposed between the first switch Q311 and second switch Q312, and a second end of the resonance circuit 311 may be connected to a second node disposed between the first diode D311 and second diode D312. The first node of the resonance circuit 311 may be connected to resonance inductor Lr while the second node of the resonance circuit 311 may be connected to resonance capacitor Cr.

In the first operation mode in which the first switch Q311 is turned on, the resonance circuit 311 accumulates electric energy in the resonance capacitor Cr using a resonance phenomenon between the resonance inductor Lr and the resonance capacitor Cr. In the second operation mode in which the second switch Q312 is turned on, the resonance circuit 311 transmits the electric energy accumulated in the resonance capacitor Cr to the electric charge storage circuit Co using the resonance phenomenon.

When the electric charge storage circuit Co is completely discharged, the initial charging capacitor C310 supplies electric energy to the electric charge storage circuit Co.

In order for the voltage drop circuit unit 310 to store electric energy in the resonance capacitor Cr using a resonance phenomenon and to supply the stored electric energy to the electric charge storage circuit Co using the resonance phenomenon, electric energy corresponding to half of the input voltage Vi needs to be stored in the resonance capacitor Cr and the electric charge storage circuit Co.

Accordingly, a separate circuit for initial charging of the resonance capacitor Cr and the electric charge storage circuit Co may be included.

The initial charging capacitor C310 supplies electric energy to the electric charge storage circuit Co prior to switching operations of the first switch Q311 and the second switch Q312 and thus initially charges the electric charge storage circuit Co.

In addition, in order to charge electric energy corresponding to half of the input voltage Vi in the electric charge storage circuit Co, the initial charging capacitor C310 may include a capacitance such as the electric charge storage circuit Co.

The voltage drop controller 320 outputs a first voltage drop control signal G311 to control the first switch Q311 and a second voltage drop control signal G312 to control the second switch Q312.

Operations of the voltage drop circuit unit 310 and the voltage drop controller 320 will be described below.

Power is initially supplied to the voltage drop circuit unit 310 and the voltage drop controller 320. The voltage drop controller 320 outputs the voltage drop control signals G311 and G312 for turning off the first switch Q311 and the second switch Q312 for a predetermined initial charging time.

The initial charging time may refer to a time for initial charging of the electric charge storage circuit Co by the initial charging capacitor C310. For example, the initial charging time may refer to a time for initial charging of the electric charge storage circuit Co by the initial charging capacitor C310 to approximately half of the input voltage Vi.

When the initial charging time elapses, the voltage drop controller 320 outputs the voltage drop control signals G311 and G312 so as to allow the first switch Q311 and the second switch Q312 to be alternately and repeatedly turned on and off according to a resonance period of the resonance circuit 311.

Figure 22:
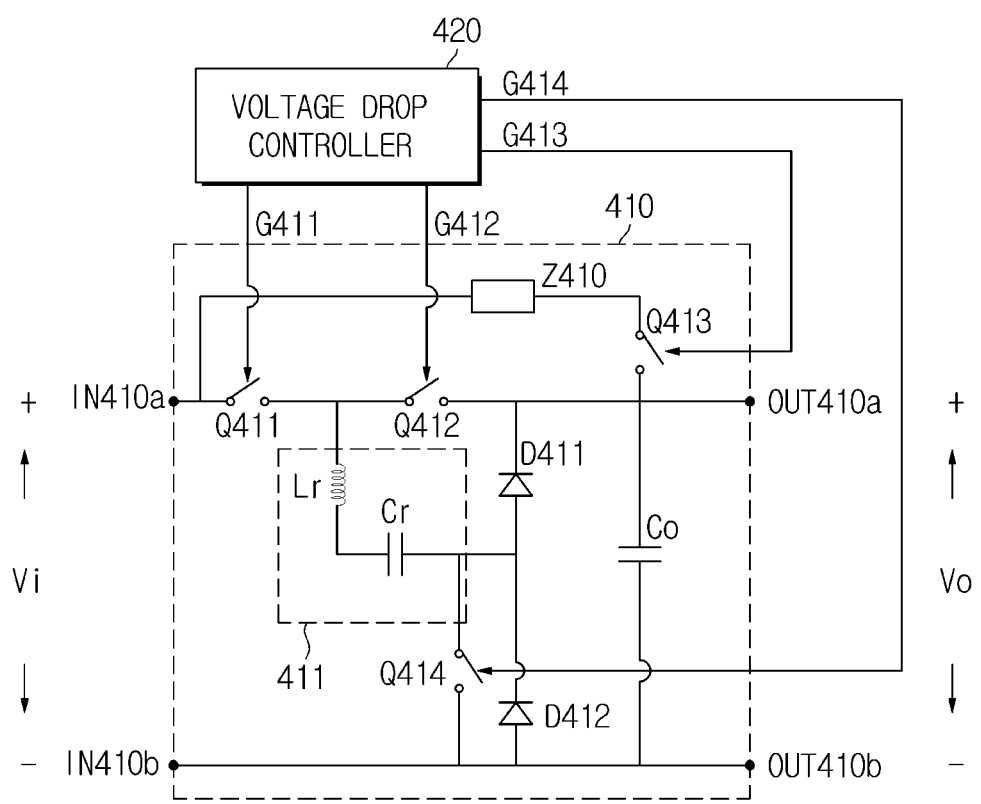
FIG. 22 illustrates a voltage drop circuit unit and a voltage drop controller according to another embodiment.

FIG. 22 illustrates a voltage drop circuit unit 410 and a voltage drop controller 420 according to another embodiment.

Referring to FIG. 22, the voltage drop circuit unit 410 and the voltage drop controller 420 are provided.

The voltage drop circuit unit 410 may include a first switch Q411 and a second switch Q412, an electric charge storage circuit Co, a first diode D411 and a second diode D412, a resonance circuit 411, a charging current limiting circuit Z410, a first initial charging switch Q413, and a second initial charging switch Q414.

Operations of the first switch Q411 and the second switch Q412, the electric charge storage circuit Co, the first diode D411 and the second diode D412, and the resonance circuit 411 may be similar to the first switch Q311 and the second switch Q312, the electric charge storage circuit Co, the first diode D311 and the second diode D312, and the resonance circuit 311 of FIG. 21, respectively, and thus their detailed descriptions are omitted herein.

The charging current limiting circuit Z410, the first initial charging switch Q413, and the second initial charging switch Q414 initially charge the resonance capacitor Cr and the electric charge storage circuit Co that are initially discharged.

For example, the charging current limiting circuit Z410 limits current so as not to supply excessive current to the resonance capacitor Cr and the electric charge storage circuit Co during initial charging. For example, when the charging current limiting circuit Z410 includes a resistive circuit, the amount of current supplied to the resonance capacitor Cr and the electric charge storage circuit Co is limited by a resistance value of the resistive circuit.

In addition, the amount of initial charged current is determined according to impedance of the charging current limiting circuit Z410. The initial charging time is also determined according to impedance of the charging current limiting circuit Z410. In other words, the impedance of the charging current limiting circuit Z410 may be changed to change the initial charged current and the initial charging time.

The first initial charging switch Q413 interrupts the initial charged current supplied to the resonance capacitor Cr and the electric charge storage circuit Co. For example, when the first initial charging switch Q413 is turned on, the initial charged current may be supplied to the resonance capacitor Cr and the electric charge storage circuit Co through the charging current limiting circuit Z410.

The charging current limiting circuit Z410 and the first initial charging switch Q413 may be connected in series to each other. The charging current limiting circuit Z410 and the first initial charging switch Q413 that are connected in series to each other may be disposed between a positive input terminal IN410a and one side of the electric charge storage circuit Co.

The second initial charging switch Q414 interrupts initial charged current supplied to the resonance capacitor Cr. In detail, when the first initial charging switch Q413 and the second initial charging switch Q414 are turned on, initial charged current is supplied to the resonance capacitor Cr through the charging current limiting circuit Z410.

The second initial charging switch Q414 may be disposed between one side of the resonance capacitor Cr and a negative input terminal IN410b. That is, the second initial charging switch Q414 may be connected in parallel to the second diode D412.

The second initial charging switch Q414 and the second diode D412 may integrally employ an insulated gate bipolar transistor (IGBT) or a field effect transistor (FET). This is because a diode parasitic on an IGBT or an FET shuts off current flowing toward the negative input terminal IN410b from a resonance capacitor Cr but passes current toward the resonance capacitor Cr from a negative output terminal OT410b.

The voltage drop controller 420 outputs a first voltage drop control signal G411 for control of the first switch Q411, a second voltage drop control signal G412 for control of the second switch Q412, a first initial charging control signal G413 for control of the first initial charging switch Q413, and a second initial charging control signal G414 for control of a second initial charging switch Q414.

However, the voltage drop controller 420 is not limited thereto. That is, the voltage drop controller 420 may control the first initial charging switch Q413 and the second initial charging switch Q414 using a single control signal instead of a separate first initial charging control signal G413 and second initial charging control signal G414.

Figure 23:
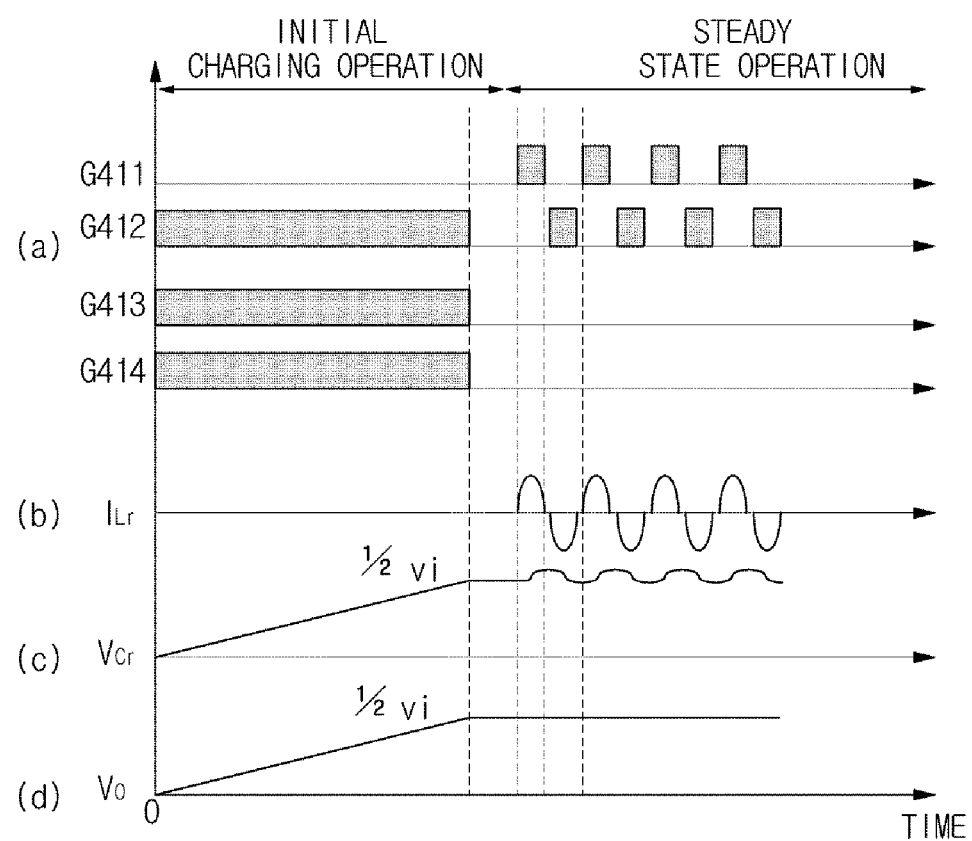
FIG. 23 is a diagram for explanation of an operation of each of the voltage drop circuit unit and the voltage drop controller illustrated in FIG. 22.
Figure 24:
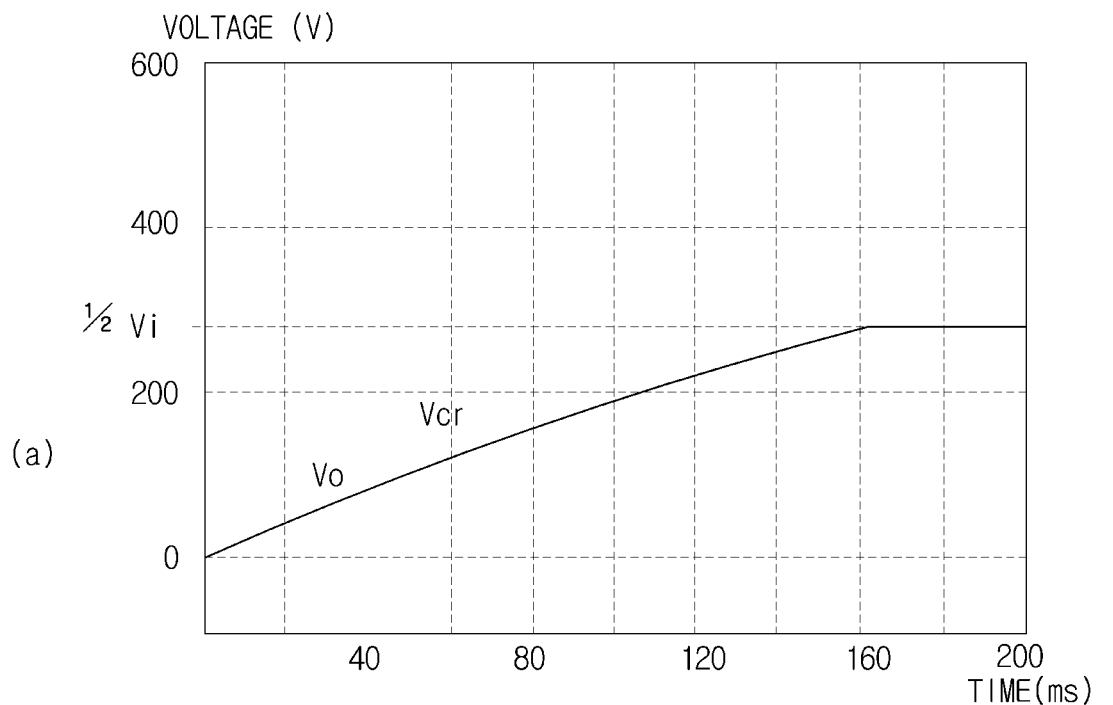
FIG. 24 is a diagram for explanation of an operation of each of the voltage drop circuit unit and the voltage drop controller illustrated in FIG. 22 during an initial charging operation.
Figure 24:
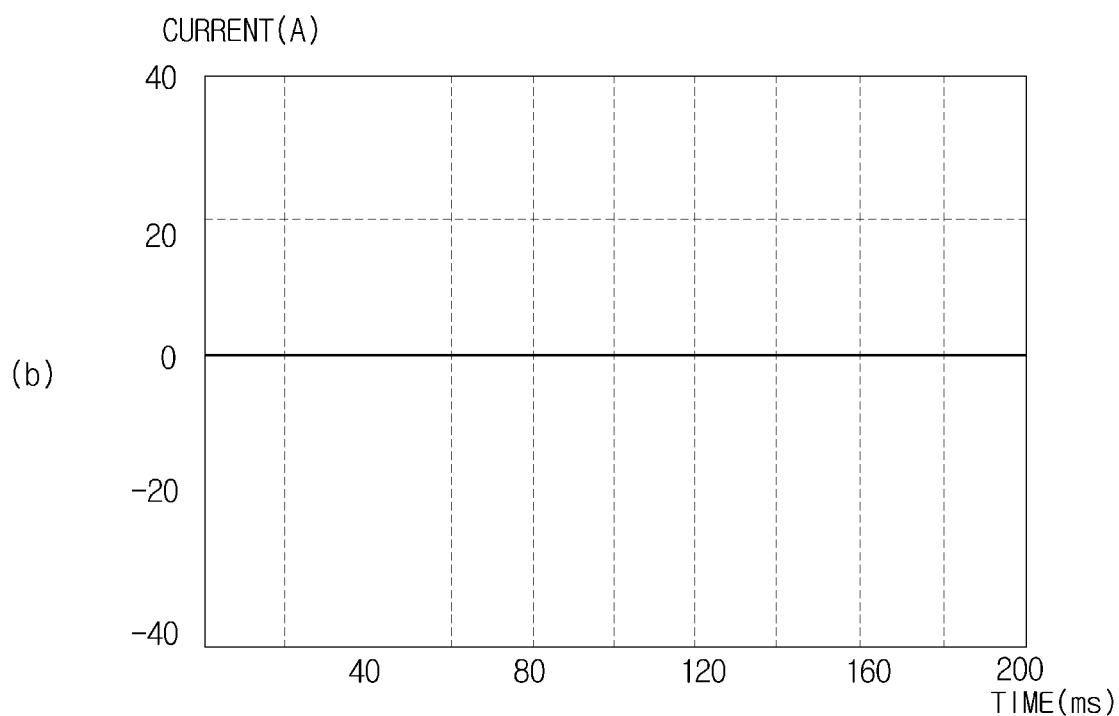
Figure 25:
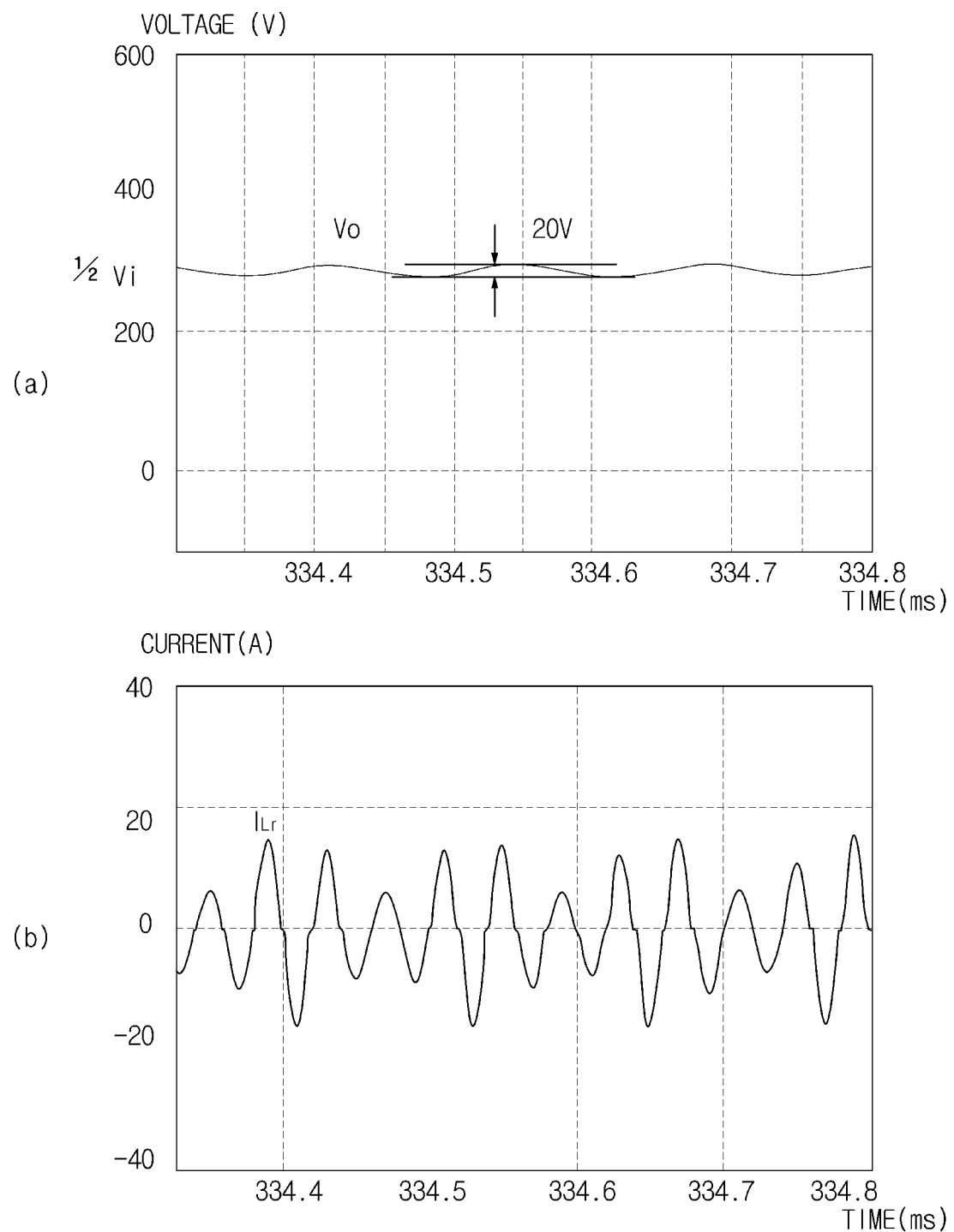
FIG. 25 is a diagram for explanation of an operation of each of the voltage drop circuit unit and voltage drop controller illustrated in FIG. 22 during a steady state operation.

FIG. 23 is a diagram for explanation of an operation of each of the voltage drop circuit unit 410 and the voltage drop controller 420 illustrated in FIG. 22. FIG. 24 is a diagram for explanation of an operation of each of the voltage drop circuit unit 410 and the voltage drop controller 420 illustrated in FIG. 22 during an initial charging operation. FIG. 25 is a diagram for explanation of an operation of each of the voltage drop circuit unit 410 and the voltage drop controller 420 illustrated in FIG. 22 during a steady state operation.

Referring to FIG. 23, the operation of each of the voltage drop circuit unit 410 and the voltage drop controller 420 may be divided into an initial charging operation for initially charging the resonance capacitor Cr and the electric charge storage circuit Co and a steady state operation for supplying electric energy to the electric charge storage circuit Co using a resonance phenomenon.

During the initial charging operation, as illustrated in FIG. 23(a), the voltage drop controller 420 outputs the first and second initial charging control signals G413 and G414 for turning on the first and second initial charging switches Q413 and Q414, and outputs the first voltage drop control signal G411 for turning off the first switch Q411 and the second voltage drop control signal G412 for turning on the second switch Q412.

However, when the first switch Q411 and the second switch Q412 employ an insulated gate bipolar transistor (IGBT) or a field effect transistor (FET), even if the second switch Q412 is not turned on, initial charging current may be supplied to the resonance capacitor Cr. This is because a diode parasitic on an IGBT or an FET shuts off current flowing toward a positive output terminal OUT410a from a positive input terminal IN410a but passes current toward the positive input terminal IN410a from the positive output terminal OUT410a.

As illustrated in FIG. 23(b), initial charging current is supplied to the resonance capacitor Cr and the electric charge storage circuit Co according to the control signals G411 to G414, and as illustrated in FIGS. 23(c) and 23(d), voltages of the resonance capacitor Cr and the electric charge storage circuit Co increase according to the initial charging current.

By way of a non-limiting example, when the input voltage Vi is 600 V, inductance of the resonance inductor Lr is 15 uH, capacitance of the resonance capacitor Cr is 3.3 uF, capacitance of the electric charge storage circuit Co is 30 uF, and resistance of the charging current limiting circuit Z410 is 7 kΩ, voltages of the resonance capacitor Cr and the electric charge storage circuit Co reach 300 V corresponding to half of the input voltage Vi when about 160 ms elapses, as illustrated in FIG. 24(a).

When each voltage of the resonance capacitor Cr and the electric charge storage circuit Co reaches 300 V, the voltage drop controller 420 outputs the first and second initial charging control signals G413 and G414 for turning off the first and second initial charging switches Q413 and Q414.

In addition, several tens of mA of current may be supplied to the resonance circuit 411, as illustrated in FIG. 24(b). That is, a current supplied to the resonance circuit 411 is approximately or substantially near zero amps as shown in FIG. 24(b), during the initial charging operation.

Then, during the steady state operation, as illustrated in FIG. 23(a), the voltage drop controller 420 outputs the first and second initial charging control signals G413 and G414 for turning off the first and second initial charging switches Q413 and Q414, and outputs the first and second voltage drop control signals G411 and G412 for alternately turning on and off the first switch Q411 and the second switch Q412.

According to the control signals G411 to G414, as illustrated in FIG. 23(b), current in the form of a sine wave flows in the resonance capacitor Cr. That is, a supply of current toward the resonance capacitor Cr and emission of current from the resonance capacitor Cr are repeated.

As illustrated in FIG. 23(c), according to the current, a voltage of the resonance capacitor Cr oscillates in the form of a sine wave in terms of Vi/2, and as illustrated in FIG. 23(d), a voltage of the electric charge storage circuit Co is output as a constant value Vi/2.

By way of a non-limiting example, when the input voltage Vi is 600 V, inductance of the resonance inductor Lr is 15 uH, capacitance of the resonance capacitor Cr is 3.3 uF, capacitance of the electric charge storage circuit Co is 30 uF, and each switching frequency of the first switch Q411 and the second switch Q412 is 25 kHz, a voltage of the electric charge storage circuit Co has ripple of approximately 20 V in terms of 300 V, as illustrated in FIG. 25(a).

In addition, as illustrated in FIG. 25(b), current in the form of a sine wave flows in the resonance circuit 411.

Figure 26:
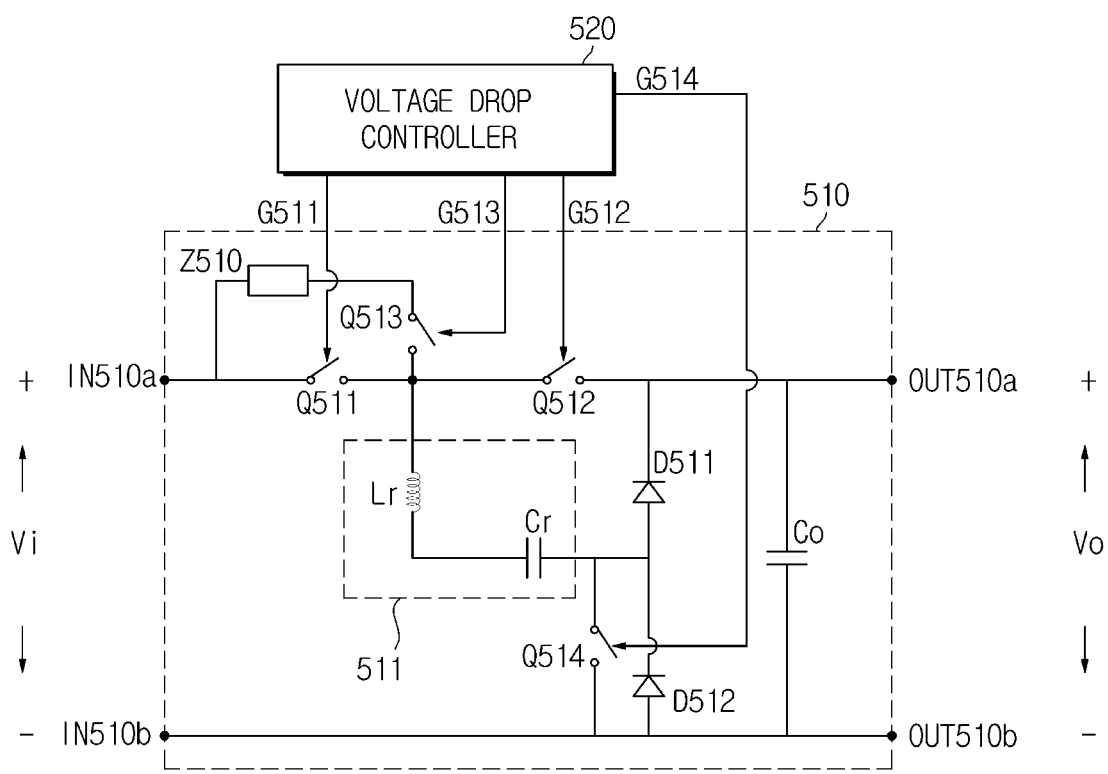
FIG. 26 illustrates a voltage drop circuit unit and a voltage drop controller according to another embodiment.

FIG. 26 illustrates a voltage drop circuit unit 510 and a voltage drop controller 520 according to another embodiment.

Referring to FIG. 26, the voltage drop circuit unit 510 and the voltage drop controller 520 are provided.

The voltage drop circuit unit 510 may include a first switch Q511 and a second switch Q512, an electric charge storage circuit Co, a first diode D511 and a second diode D512, a resonance circuit 511, a charging current limiting circuit Z510, a first initial charging switch Q513, and a second initial charging switch Q514.

Operations of the first switch Q511 and the second switch Q512, the electric charge storage circuit Co, the first diode D511 and the second diode D512, and the resonance circuit 511 may be similar to the first switch Q311 and the second switch Q312, the electric charge storage circuit Co, the first diode D311 and the second diode D312, and the resonance circuit 311 of FIG. 21, respectively, and thus their detailed descriptions are omitted herein.

The charging current limiting circuit Z510, the first initial charging switch Q513, and the second initial charging switch Q514 initially charge the resonance capacitor Cr and the electric charge storage circuit Co that are initially discharged.

For example, the charging current limiting circuit Z510 limits current so as not to supply excessive current to the resonance capacitor Cr and the electric charge storage circuit Co during initial charging, and the first initial charging switch Q513 interrupts initial charging current supplied to the resonance capacitor Cr and the electric charge storage circuit Co.

The charging current limiting circuit Z510 and the first initial charging switch Q513 may be connected in series to each other. The charging current limiting circuit Z510 and the first initial charging switch Q513 that are connected in series to each other may be disposed between a positive input terminal IN510a and a node to which the first switch Q511 and the second switch Q512 are connected.

The second initial charging switch Q514 interrupts initial charging current supplied to the resonance capacitor Cr and may be disposed between the resonance capacitor Cr and a negative input terminal IN510b. That is, the second initial charging switch Q514 may be connected in parallel to the second diode D512.

The voltage drop controller 520 outputs a first voltage drop control signal G511 for control of the first switch Q511, a second voltage drop control signal G512 for control of the second switch Q512, a first initial charging control signal G513 for control of the first initial charging switch Q513, and a second initial charging control signal G514 for control of a second initial charging switch Q513.

Figure 27:
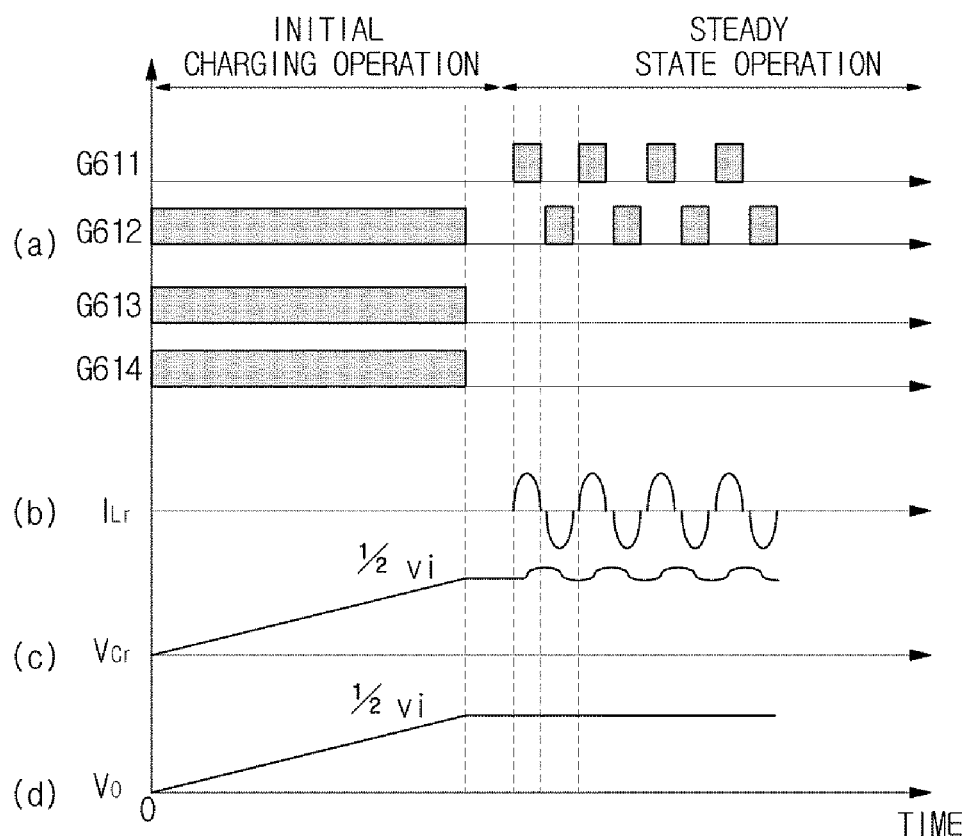
FIG. 27 is a diagram for explanation of each operation of the voltage drop circuit unit and the voltage drop controller illustrated in FIG. 26.

FIG. 27 is a diagram for explanation of each operation of the voltage drop circuit unit 510 and the voltage drop controller 520 illustrated in FIG. 26.

Referring to FIG. 27, during an initial charging operation, as illustrated in FIG. 27(a), the voltage drop controller 520 outputs the first and second initial charging control signals G513 and G514 for turning on the first and second initial charging switches Q513 and Q514, and outputs the first voltage drop control signal G511 for turning off the first switch Q511 and the second voltage drop control signal G512 for turning on the second switch Q512.

According to the control signals G511 to G514, as illustrated in FIG. 27(b), an initial charging current is supplied to the resonance capacitor Cr and the electric charge storage circuit Co, and according to the initial charging current, as illustrated in FIGS. 27(c) and 27(d), voltages of the resonance capacitor Cr and the electric charge storage circuit Co increase to about half of the input voltage Vi.

Then, during a steady state operation, as illustrated in FIG. 27(a), the voltage drop controller 520 outputs the first and second initial charging control signals G513 and G514 for turning off the first and second initial charging switches Q513 and Q514, and outputs the first and second voltage drop control signals G511 and G12 for alternately turning on and off the first switch Q511 and the second switch Q512.

In addition, as illustrated in FIG. 27(c), according to the current, a voltage of the resonance capacitor Cr oscillates in the form of a sine wave in terms of Vi/2, and as illustrated in FIG. 27(d), a voltage of the electric charge storage circuit Co is output as a constant value Vi/2.

Figure 28:
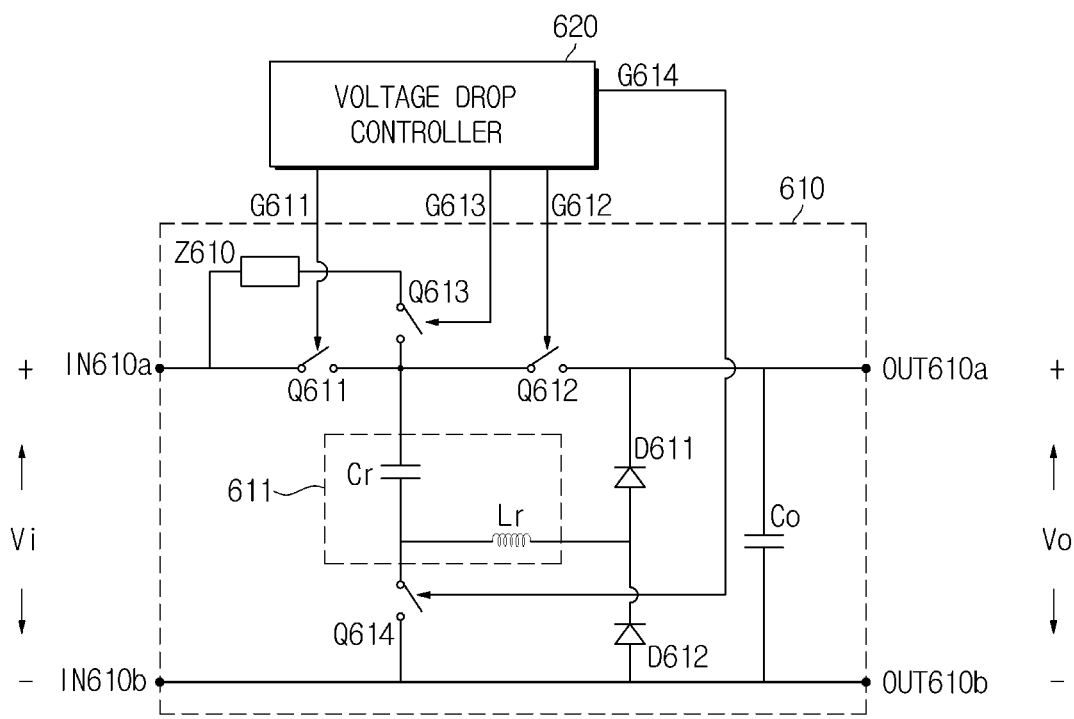
FIG. 28 illustrates a voltage drop circuit unit and a voltage drop controller according to another embodiment.

FIG. 28 illustrates a voltage drop circuit unit 610 and a voltage drop controller 620 according to another embodiment.

Referring to FIG. 28, the voltage drop circuit unit 610 and the voltage drop controller 620 are provided.

The voltage drop circuit unit 610 may include a first switch Q611 and a second switch Q612, an electric charge storage circuit Co, a first diode D611 and a second diode D612, a resonance circuit 611, a charging current limiting circuit Z610, a first initial charging switch Q613, and a second initial charging switch Q614.

Comparing the resonance circuit 511 illustrated in FIG. 26 and the resonance circuit 611 illustrated in FIG. 28, the resonance inductor Lr and the resonance capacitor Cr included in the resonance circuit 611 of FIG. 28 are arranged in an opposite order to that of the resonance inductor Lr and the resonance capacitor Cr included in the resonance circuit 511 of FIG. 26. That is, the resonance circuit 511 of FIG. 26 is configured in such a way that the resonance capacitor Cr is disposed at a side of the first and second diodes D511 and D512, whereas the resonance circuit 611 of FIG. 28 is configured in such a way that the resonance capacitor Cr is disposed at a side of the first and second switches Q611 and Q612. That is, the resonance capacitor Cr of resonance circuit 511 is disposed such that it is connected to a node between first and second diodes D511 and D512, and the inductor Lr of resonance circuit 511 is disposed such that it is connected to a node between the first and second switches Q511 and Q512. Contrary to the arrangement of resonance circuit 511, the resonance capacitor Cr of resonance circuit 611 is disposed such that it is connected to a node between the first and second switches Q611 and Q612, and the inductor Lr of resonance circuit 611 is disposed such that it is connected to a node between the first and second diodes D611 and D612. Furthermore, it can be seen that is configured in such a way that the resonance capacitor Cr is disposed at a side of the first and second switches Q611 and Q612.

Furthermore, it can be seen from FIG. 28 that the second initial charging switch Q614 may be disposed between one side of the resonance capacitor Cr and a negative input terminal IN610b. Of course, the second initial charging switch Q614 may alternately be disposed between one side of the resonance inductor Lr and the negative input terminal IN610b.

Although example embodiments of the disclosure have been shown and described, it would be appreciated by those skilled in the art that changes may be made to these embodiments without departing from the principles and spirit of the invention, the scope of which is defined in the claims and their equivalents.

What is claimed is:

1. A power supply comprising:
    a smoothing circuit unit to receive a voltage and to smoothen the voltage; and
    a voltage drop circuit unit to drop the smoothened voltage, wherein the voltage drop circuit unit comprises:
    an electric charge storage circuit to output the dropped smoothened voltage;
    a resonance circuit to receive first current from the smoothing circuit unit and to supply second current to the electric charge storage circuit;
    a switching circuit, the switching circuit including:
        a first switch to control the first current such that the first current is supplied to the resonance circuit and the electric charge storage circuit via the first switch; and
        a second switch to control the second current such that the second current is supplied to the electric charge storage circuit via the second switch; and
    a rectifier circuit, the rectifier circuit including:
        a first diode to pass the first current and to shut off the second current; and
        a second diode to pass the second current and to shut off the first current.

2. The power supply according to claim 1, further comprising a voltage drop controller to control the first switch and the second switch.

3. The power supply according to claim 2, wherein the voltage drop controller alternately opens and closes the first switch and the second switch.

4. The power supply according to claim 3, wherein the voltage drop controller opens and closes the first switch and the second switch at a same period as a resonance period of the resonance circuit.

5. The power supply according to claim 1, wherein the first switch and the second switch are connected in series to each other.

6. The power supply according to claim 5, wherein the first diode and the second diode are connected in series to each other.

7. The power supply according to claim 6, wherein the resonance circuit is disposed between a node to which the first switch and the second switch are connected and a node to which the first diode and the second diode are connected.

8. The power supply according to claim 7, wherein the resonance circuit comprises at least one capacitor and at least one inductor.

9. The power supply according to claim 1, further comprising an initial charging circuit to initially charge the electric charge storage circuit.

10. The power supply according to claim 9, wherein the initial charging circuit is disposed in series between one side of the electric charge storage circuit and one side of the switching circuit.

11. The power supply according to claim 10, wherein the initial charging circuit comprises a charged current limiting circuit to limit an amount of initial charged current for charging the electric charge storage circuit, and a first initial charging switch to interrupt initial charged current supplied to the electric charge storage circuit.

12. The power supply according to claim 11, wherein the initial charging circuit further comprises a second initial charging switch to interrupt initial charged current supplied to a resonance capacitor included in the resonance circuit.

13. The power supply according to claim 12, wherein the second initial charging switch is disposed between the other side of the electrical charge storage circuit and the resonance capacitor included in the resonance circuit.

14. A voltage drop circuit for dropping a voltage of a power source, the voltage drop circuit comprising:
    an electric charge storage circuit unit to output the dropped voltage;
    a resonance circuit unit to receive first current from the power source and to supply second current to the electric charge storage circuit;
    a switching circuit, the switching circuit including:
        a first switch to control the first current such that the first current is supplied to the resonance circuit unit and the electric charge storage circuit unit via the first switch; and
        a second switch to control the second current such that the second current is supplied to the electric charge storage circuit unit via the second switch; and
    a rectifier circuit, the rectifier circuit including:
        a first diode to pass the first current and to shut off the second current; and
        a second diode to pass the second current and to shut off the first current.

15. The voltage drop circuit according to claim 14, further comprising a voltage drop controller to control the first switch and the second switch.

16. The voltage drop circuit according to claim 15, wherein the voltage drop controller alternately opens and closes the first switch and the second switch.

17. The voltage drop circuit according to claim 16, wherein the voltage drop controller opens and closes the first switch and the second switch at the same period as a resonance period of the resonance circuit.

18. The voltage drop circuit according to claim 14, further comprising an initial charging circuit to initially charge the electric charge storage circuit.

19. The voltage drop circuit according to claim 18, wherein the initial charging circuit comprises a charged current limiting circuit to limit an amount of initial charged current for charging the electric charge storage circuit, and a first initial charging switch to interrupt initial charged current supplied to the electric charge storage circuit.

20. A voltage drop circuit for dropping a voltage of a power source, the voltage drop circuit comprising:
    at least one electric charge storage circuit unit to output the dropped voltage;
    at least one resonance circuit unit to receive first current from the power source and to supply second current to the electric charge storage circuit;
    a switching circuit including a first switch to interrupt the first current and a second switch to interrupt the second current;

a rectifier circuit to rectify the first current and the second current; and a voltage drop controller to control the switching circuit, wherein the rectifier circuit comprises:

a first plurality of diodes connected in series to pass the first current and to shut off the second current when the first switch is controlled to be closed and the second switch is controlled to be opened; and a second plurality of diodes connected in series to shut off the first current and to pass the second current when the first switch is controlled to be open and the second switch is controlled to be closed.

21. The voltage drop circuit according to claim 20, wherein the first switch receives a first control signal from the voltage drop controller to interrupt the first current and the second switch receives a second control signal from the voltage drop controller to interrupt the second current.

22. The voltage drop circuit according to claim 20, wherein:

the at least one resonance circuit comprises:

a resonance inductor; and a resonance capacitor, and a first end of the resonance circuit is connected to a first node disposed between the first switch and the second switch, and a second end of the resonance circuit is connected to a second node disposed between one of the first plurality of diodes and one of the second plurality of diodes.

23. The voltage drop circuit according to claim 22, wherein the resonance capacitor is connected to the first node and the resonance inductor is connected to the second node.

24. The voltage drop circuit according to claim 20, wherein the at least one electric charge storage circuit unit comprises:

a first electric charge storage circuit connected in series with a second electric charge storage circuit, wherein a first node disposed between the first electric charge storage circuit and the second electric charge storage is connected to a second node disposed between one of the first plurality of diodes and one of the second plurality of diodes.

25. The voltage drop circuit according to claim 20, wherein the at least one resonance circuit comprises:

a first resonance circuit including a resonance inductor and a first resonance capacitor; and a second resonance circuit including the resonance inductor and a second resonance capacitor, wherein a first end of the first resonance circuit is connected to a first node disposed between the first switch and the second switch, and a second end of the first resonance circuit is connected to a second node disposed between one of the first plurality of diodes and one of the second plurality of diodes, and a first end of the second resonance circuit is connected to the first node, and a second end of the second resonance circuit is connected to a third node disposed between one of the first plurality of diodes and one of the second plurality of diodes.

\* \* \* \* \*